(12) United States Patent
Ishii et al.

(10) Patent No.: US 7,380,208 B2
(45) Date of Patent: May 27, 2008

(54) IMAGE PROCESSING APPARATUS, IMAGE PROCESSING PROGRAM AND IMAGE PROCESSING METHOD

(75) Inventors: Akira Ishii, Ashigarakami-gun (JP); Yoshifumi Takebe, Ashigarakami-gun (JP); Takashi Yamamuro, Ebina (JP); Makoto Hirota, Ebina (JP); Toru Misaizu, Ebina (JP); Yasuki Yamauchi, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 841 days.

(21) Appl. No.: 10/385,648

(22) Filed: Mar. 12, 2003

(65) Prior Publication Data
US 2004/0120596 A1   Jun. 24, 2004

(30) Foreign Application Priority Data
Dec. 20, 2002   (JP)   ............................. 2002-371140

(51) Int. Cl.
| | |
|---|---|
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |

(52) U.S. Cl. ....................... 715/274; 382/173; 358/1.18
(58) Field of Classification Search ................ 382/174, 382/173; 345/419, 204; 715/527, 274; 358/1.18
See application file for complete search history.

(56) References Cited

U.S. PATENT DOCUMENTS

| | | | | |
|---|---|---|---|---|
| 5,930,810 | A | * | 7/1999 | Farros et al. ............... 715/506 |
| 6,081,611 | A | * | 6/2000 | Linford et al. ............. 382/128 |
| 6,980,218 | B1 | * | 12/2005 | Demers et al. ............. 345/584 |
| 2003/0117385 | A1 | * | 6/2003 | Itoh et al. ................... 345/204 |
| 2005/0001788 | A1 | * | 1/2005 | Wenger ......................... 345/7 |

FOREIGN PATENT DOCUMENTS

| | | |
|---|---|---|
| JP | A 2001-134006 | 5/2001 |
| JP | A 2001-134091 | 5/2001 |
| JP | A 2001-194846 | 7/2001 |
| JP | A 2002-244384 | 8/2002 |
| JP | A 2002-278370 | 9/2002 |

OTHER PUBLICATIONS

Using Microsoft Word 97, Bill Camarda, 1997,ebook ISBN 9780585332185, IBN 9780789713988, pp. 54 and 357.*

* cited by examiner

*Primary Examiner*—Bhavesh M. Mehta
*Assistant Examiner*—John B Strege
(74) *Attorney, Agent, or Firm*—Oliff & Berridge, PLC

(57) ABSTRACT

An image processing apparatus comprises an image generating unit for generating an image from image data for an image containing an embossed part formed on a medium, the image generated by the image generating unit being different in form of the embossed part or neighborhood thereof from the image formed on the medium, and a display control unit for displaying the image generated by the image generating unit on a display apparatus.

20 Claims, 20 Drawing Sheets

DISPLAY WITH
FLASHING EMBOSSED PART

DISPLAY WITH EMBOSSED PART
IN SPECIFIC COLOR

DISPLAY WITH
SHADOWED EMBOSSED PART

DISPLAY WITH
FLASHING EMBOSSED PART

DISPLAY REPRESENTING
HEIGHT OF EMBOSSED PART

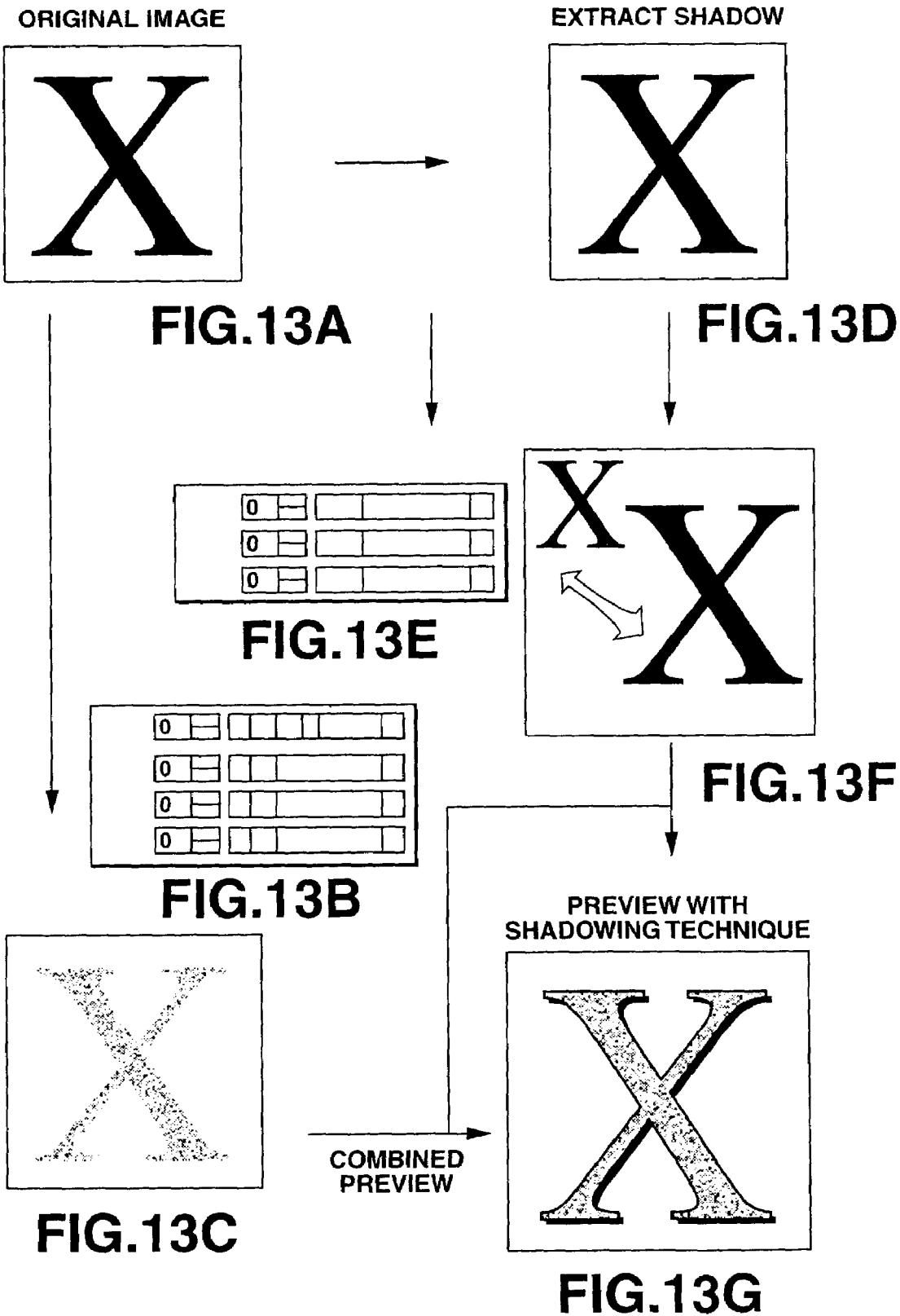

PRESSURE

FOAMING
TONER
QUANTITY

LARGE

SMALL

IMAGE PROCESSING APPARATUS, IMAGE PROCESSING PROGRAM AND IMAGE PROCESSING METHOD

BACKGROUND OF THE INVENTION

1. Field of the Invention

The present invention relates to an image processing apparatus, an image processing program, and an image processing method for displaying an image simulating a printed form of image data subject to embossing print, and more specifically to an image processing apparatus, an image processing program, and an image processing method for showing a preview allowing easy recognition of an embossed part.

2. Description of the Related Art

Today, an image forming apparatus such as a printer and a copying machine which applies electrophotography and electrostatic recording to form an embossed image using foaming toner is known.

Publicly known art for print of these types of embossed images (embossing print) include, for example, technology which uses achromatic foaming toner to print character data such as braille and image data such as a map representing topography as embossing print.

Publicly known art for achieving embossing print including a color image by coloring a foaming toner image includes art described in Japanese Unexamined Patent Publications 2001-134006, 2001-134091, and 2001-194846.

In the aforementioned publicly known art, toner images each containing a color material of a predetermined color are placed on a foaming toner image in an electrophotography recording process, for example, and individual toner images placed on the foaming toner image are melted and fixed after the foaming toner image are foamed with the heat generated in the fixing process, thereby providing an embossed image.

A system configuration for realizing such embossing print includes a configuration where a personal computer (PC) and an embossing printer are connected with each other over a network, a print file where a tag and the like is used to specify a region for an embossed part is generated on the PC using different types of application software, and printing is instructed to the embossing printer.

Usually, a user interface (UI) is provided to show a print preview for reviewing a finished state when a print instruction is provided from the PC to the printer, and this UI allows repeating the review of the print state on the print preview, and then providing the print instruction, thereby obtaining a print with a desired finish.

This standard print preview provides a display faithful to a top view appearance of an image to be printed out (printed matter) as much as possible.

However, it is impossible to recognize where the embossed parts exist when the image faithful to the top view appearance of the printout is displayed as a preview in the aforementioned embossing print.

The reasons for this mainly include that the height of the embossed part on the embossing print is about some hundreds microns, the embossment is achieved by vertical protrusions with respect to the surface of the sheet, and an embossed image cannot be recognized if the embossed image underlie a normal image.

As described above, there has been such a problem that any standard print preview equipped for a PC does not provide an effective preview display for an embossing print so that how and where an embossed image is printed cannot be recognized.

SUMMARY OF THE INVENTION

The present invention has been made in view of the above circumstances, and provides an image processing apparatus, an image processing program and an image processing method for achieving an effective preview display for an embossing print, thereby allowing easy recognition of the embossed part on an embossing printed image before the embossing print is conducted.

In one aspect of the present invention, an image processing apparatus comprises image generating unit for generating an image from image data for an image containing an embossed part formed on a medium, the image generated by the image generating unit being different in form of the embossed part or neighborhood thereof from the image formed on the medium; and display control unit for displaying the image generated by the image generating unit on a display apparatus.

In another aspect of the present invention, in an image processing program for realizing functions on a computer, the functions comprises an image generating function for generating an image from image data for an image containing an embossed part formed on a medium, the generated image being different in form of an embossed part or neighborhood thereof from the image formed on the medium; and a display control function for displaying the image generated by the image generating function on a display apparatus.

In still another aspect of the present invention, an image processing method comprises the steps of generating an image from image data for an image containing an embossed part formed on a medium, the generated image being different in form of an embossed part or neighborhood thereof from the image formed on the medium; and displaying the image generated by the image generating unit on a display apparatus.

With the present invention, it is possible to easily recognize a portion where an embossed part exists from a displayed image.

BRIEF DESCRIPTION OF THE DRAWINGS

Embodiments of the present invention will be described in detail based on the following drawings, wherein:

FIGS. 13A through 13G are views showing appearances with adjusted image quality of an embossed part using a partially zooming-in viewer;

DESCRIPTION OF THE EMBODIMENTS

The following section details embodiments of the present invention while referring to accompanying drawings.

Figure 1:
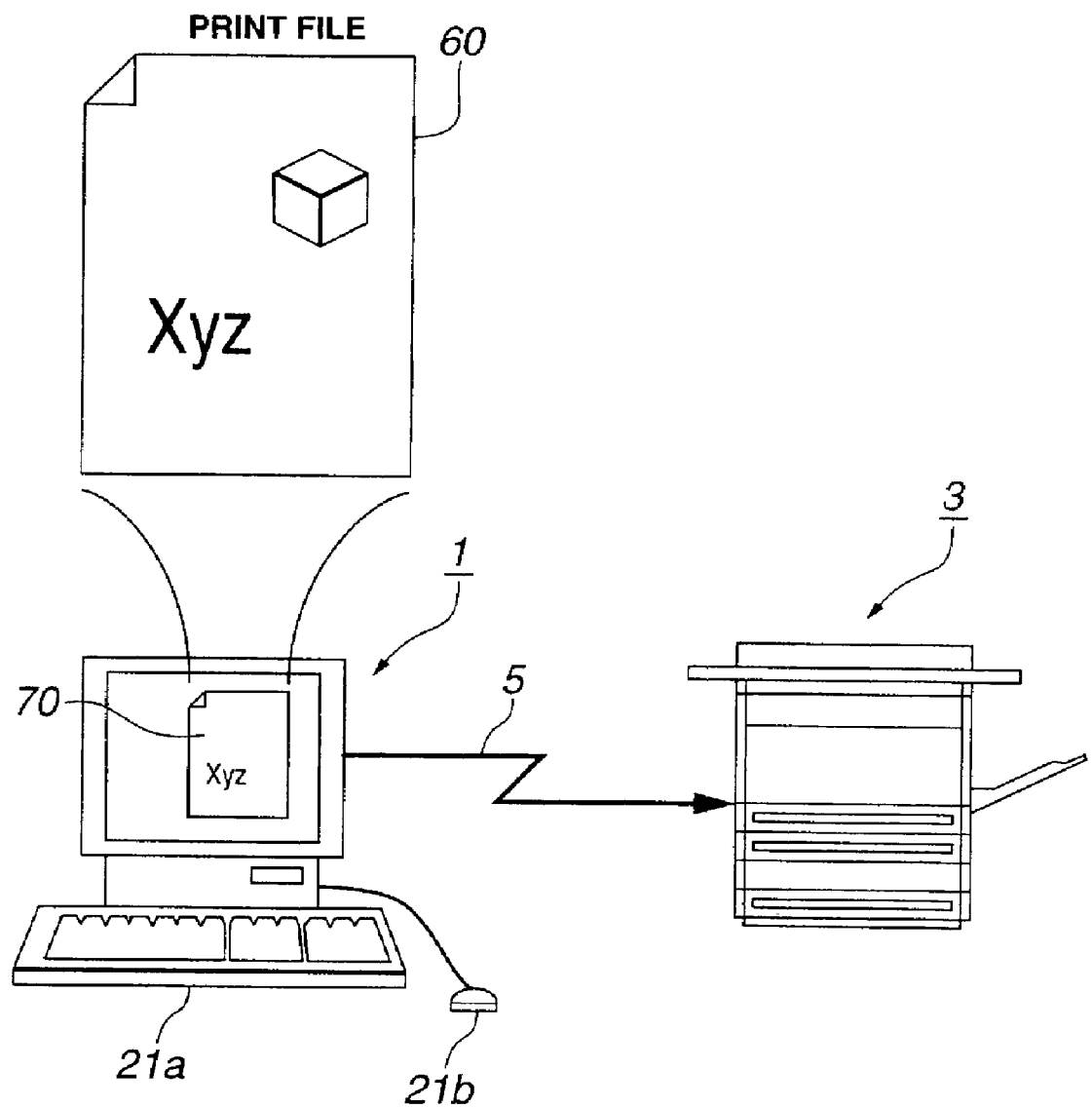
FIG. 1 shows an overall configuration of an embossed image print system according to the present invention.

FIG. 1 is a block diagram showing an overall configuration of an embossing print system according to the present invention.

This system, for example, is constituted by connecting an image processing apparatus 1 using a PC and an embossing printer 3 using foaming toner to print out an embossed image over a network 5.

The image processing apparatus 1 has a function of generating a simulation image of a printed form of image from an image data subject to embossing print (image data from which an image with an embossed part is formed on a medium), and showing the simulation image as a preview on a display apparatus.

Especially, the image displayed as a preview on this image processing apparatus 1 is, for example, an image different in the form of an embossed part or the neighborhood thereof (see FIGS. 4 through 7) from an image produced when image data subject to the embossing print is printed out (image to be printed out).

With this preview display function, a user can easily recognize where an embossed part exists on the previewed image even if a top view appearance of an image to be printed out is displayed as the preview.

On the image processing apparatus 1, the image data subject to the embossing print is, for example, a print file generated by the apparatus itself by using different types of application software. In this case, data such as a tag indicating that an object is an embossed part is described in the print file corresponding to this embossed part.

As a result, when the image processing apparatus 1 generates, from the print file, an image whose embossed part is different in form from that of an image to be printed out, and displays the image as a preview, the image processing apparatus 1 identifies the embossed part based on data such as the tag described above, and generates an image different in the form of the embossed part from an image to be printed out.

Figure 4:
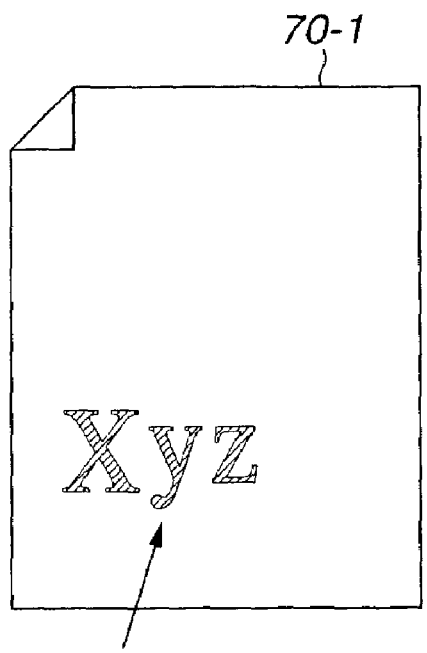
FIG. 4 is a view showing a display example of a preview image representing an embossed part in a specific color.

FIG. 1 shows a processing appearance when the image processing apparatus 1 generates a print file 60 including both an embossed part (character part "Xyz" in this example), and a non-embossed part (cube figure), generates an image (an image corresponding to a specific color representation shown in FIG. 4, for example), which is different in the form of the embossed part (character part "Xyz") from an image to be printed out, from the print file 60, and displays the image as a preview (preview image 70).

Also, the image data subject to the embossing print may be obtained such that image data read in by an image reading apparatus (scanner), which is not shown, is entered into the image processing apparatus 1 through a predetermined interface, for example.

In this case, in terms of the image data (comprising three-color data in red (R), green (G), and blue (B)), by determining a condition specifying which color corresponds to an embossed part in advance, for example, the image processing apparatus 1 can recognize which part in the image data entered from the scanner is the embossed part by referring to the condition.

Consequently, the image processing apparatus 1 can generate an image different in the form of an embossed part from an image to be printed out, and can display it as a preview.

Also, the image processing apparatus 1 has a print simulation processing function which allows specifying different types of conditions including the characteristics of an embossed part (such as the volume and the color of a protrusion, and the color and the size of a shadowed part), which is recognized by observing the image displayed as a preview described above, and edits the image data again based on the specified conditions so as to provide a preview again, thereby simulating the form of the printed result of the embossed part appearing in the embossing print.

Repeating this print simulation while the image quality of the image represented as a preview and the like are being reviewed allows setting conditions for an embossed part of image data subject to the embossing print such that the embossed part represents an embossed image in a preferred form when the image data is actually embossing-printed.

Also, the image processing apparatus 1 has a print instruction function which sequentially records processing history of the aforementioned print simulation applied to image data subject to the embossing print, generates a job file based on the processing history, and simultaneously combines certain image data and the job file corresponding to the image data for sending out the combination of them to the embossing printer 3 when a print instruction is given to the image data.

Figure 2:
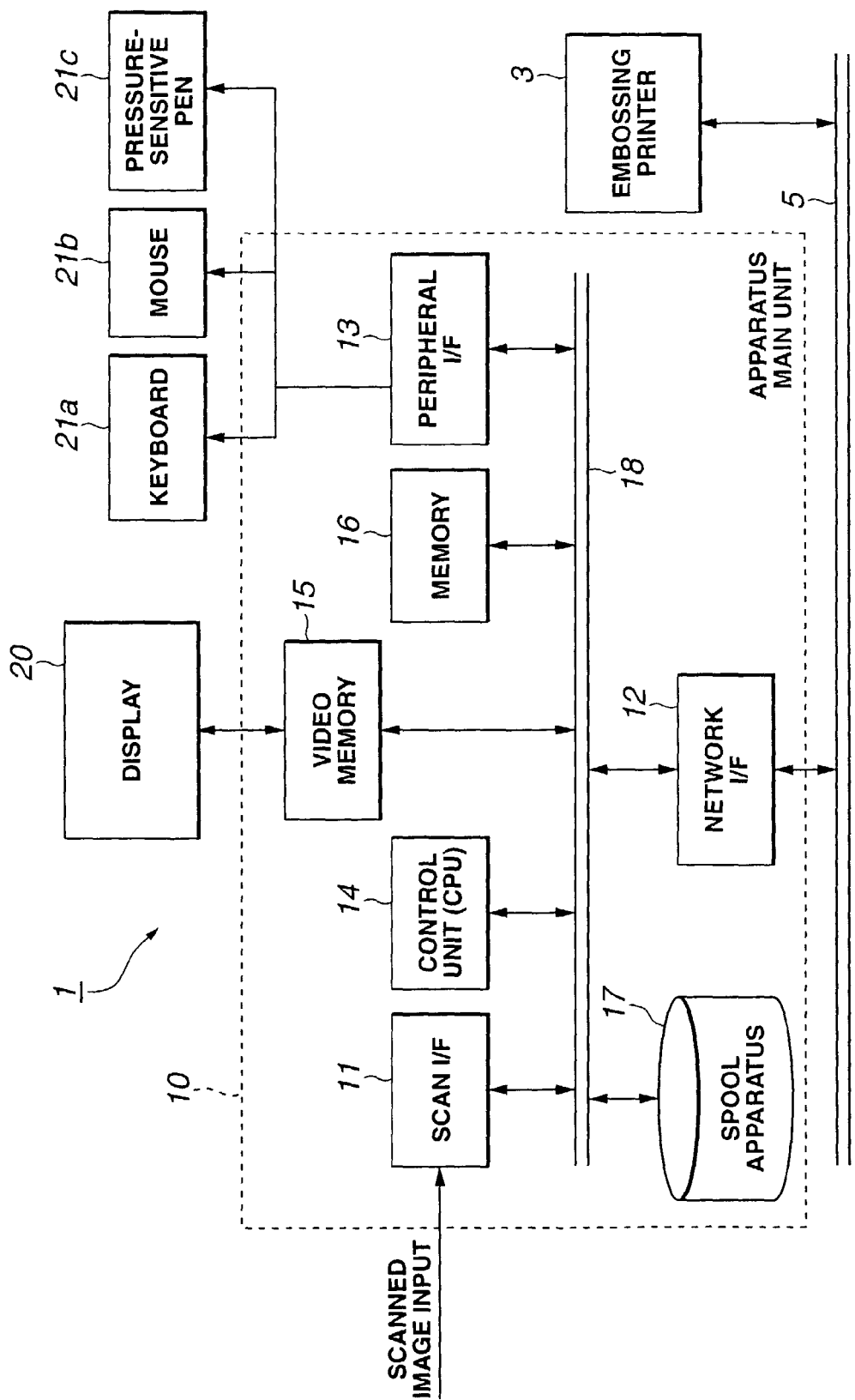
FIG. 2 is a block diagram showing a functional configuration of the image processing apparatus according to the present invention.

FIG. 2 is a block diagram showing a functional configuration of the image processing apparatus 1 according to the present invention.

As shown in FIG. 2, the image processing apparatus 1 comprises an apparatus main unit 10, a display unit 20 for showing different types of data such as a preview image generated by the image processing function of the apparatus main unit 10, and user interface (UI) devices 21 (such as a keyboard 21a, a mouse 21b, and a pressure-sensitive pen 21c) for entering different types of instructions to the apparatus main unit 10 relating to the preview display described above and the like, and different types of instructions and data such as a region selection and characteristics of an embossed part.

The apparatus main unit 10 comprises a scan interface (I/F) 11 for entering image data (image data subject to the embossing print) from a scanner which is not shown, a network interface 12 for managing an interface with the network 5 to which the embossing printer 3 is connected, a peripheral interface 13 for managing the different types of the UI devices 21, a control unit (CPU) 14 for controlling the entire apparatus, and simultaneously conducting control including the print simulation where a preview is displayed on the display unit 20 based on the image data subject to the embossing print, and image processing is applied to the image data subject to the embossing print according to an instruction from the UI device 21, thereby redisplaying the image after the processing on the display unit 20, and the print instruction for image data subject to the embossing print, a video memory 15 for storing corresponding image data when an image such as a preview image is displayed on the display unit 20, a memory unit 16 for storing different types of data such as image data subject to the embossing print, and an operation program for the control unit 14, a spool apparatus 17 for conducting spooling which concurrently executes independent programs requiring the CPU such that a display control program is executed while a print control program is running, and an internal bus 18 for transmitting and receiving data between the control unit 14 and other individual parts.

Figure 3:
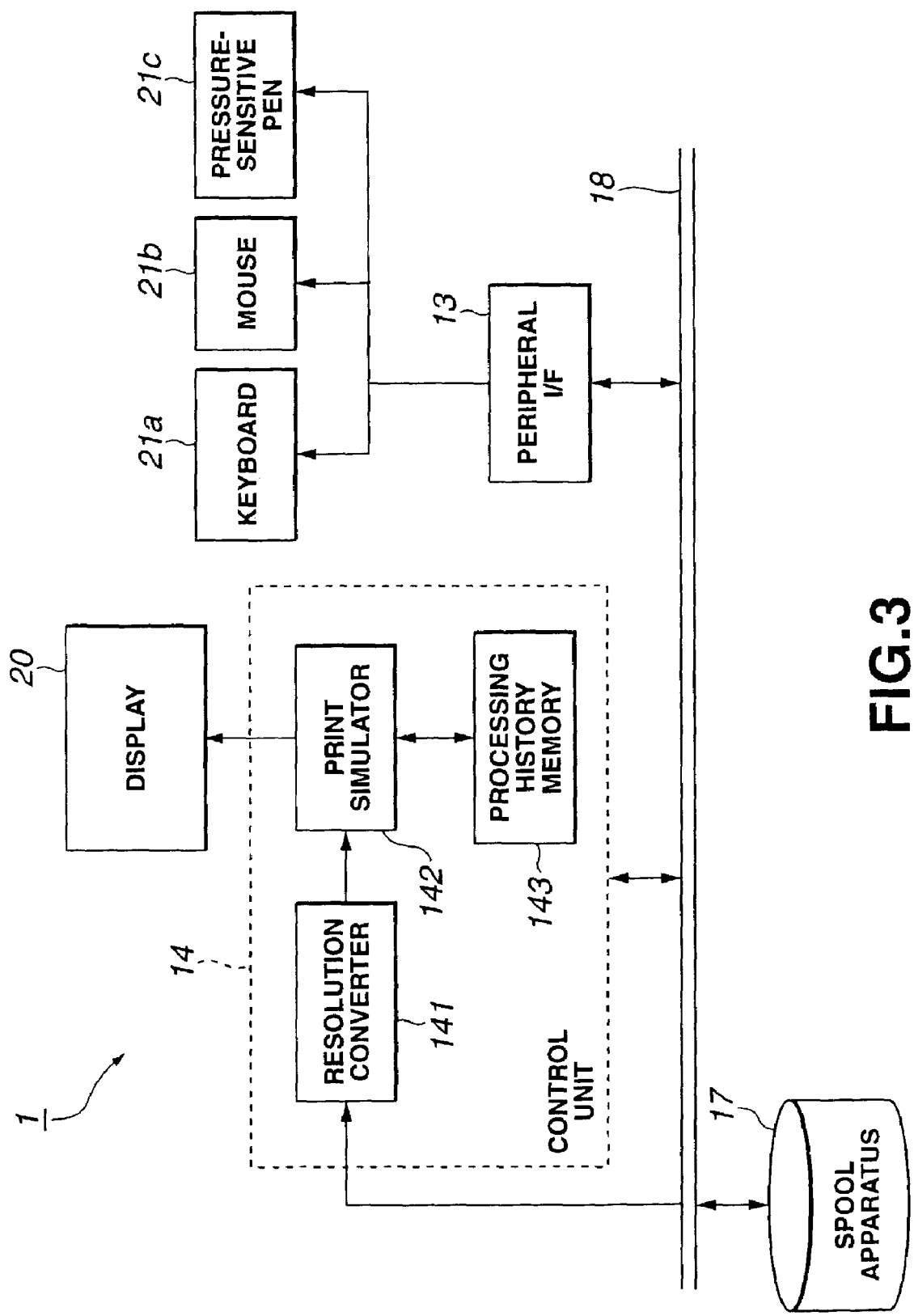
FIG. 3 is a view showing a detailed configuration of a control unit of an image processing apparatus according to a first embodiment.

FIG. 3 shows a detailed configuration of the control unit 14 of the image processing apparatus 1 according to a first embodiment.

In FIG. 3, the control unit 14 comprises a resolution converting unit 141, a print simulator 142, and a processing history memory unit 143.

The resolution converting unit 141 conducts resolution converting processing which obtains image data subject to the embossing print, and decreases the image size for the preview processing.

The print simulator 142 has an image generating function for generating an image from image data subject to the embossing print, and a display control function for displaying the image generated by the image generating function on the display unit 20, and, especially in the present invention, has a function for generating an image from image data after the resolution conversion by the image resolution converting unit 141, and showing the generated image on the display unit 20 as a preview.

Also, the print simulator 142 has a print simulation function which, when an instruction for zooming in/out and viewpoint manipulation is provided from the UI device 21 to the image represented as a preview as described above, applies image processing corresponding to the instruction to the subject image data based on the instruction, and redisplays the image based on the image data after the processing on the display unit 20.

The processing history memory unit 143 stores the history of the image processing applied to corresponding image data based on an instruction from the UI device 21 in the print simulator 142.

The following section describes the processing operation of the image processing apparatus 1.

First, description for the preview display control operation based on image data subject to the embossing print is provided.

It is assumed that the data subject to the embossing print is a print file 60 (see FIG. 1) generated by the image processing apparatus 1 itself.

The image processing apparatus 1 executes required application software under the control of the control unit 14, simultaneously generates the print file 60 described above based on data entered from the UI device 21 such as the keyboard 21a on an edit screen displayed on the display unit 20, and stores the print file 60 in the memory unit 16, for example.

When the print file 60 is generated (edited), a user adds embossed part identifying data (such as a tag) indicating so to an embossed part (embossed object). In this example, it is assumed that the character part (Xyz) in the print file 60 is an embossed part, and the other part (figure of the cube) is a non-embossed part.

It is assumed that the preview display instruction operation is conducted on the keyboard 21a when the print file 60 is generated (edited).

Based on this preview display instruction, the control unit 14 obtains the image data subject to the embossing print (print file 60) from the memory unit 16 through the spool apparatus 17, uses the resolution converting unit 141 to convert the data into an image with a reduced size for the preview processing, and provides the print simulator 142 with the image.

The print simulator 142, first, extracts the embossed part from the image for the preview processing (image data subject to the embossing print) transmitted from the resolution converting unit 141 while referring to the embossed part identifying data such as a tag.

Then, the print simulator 142 generates an image different in the form of the embossed part from an image to be printed out based on the extraction result described above, and displays the image as a preview on the display unit 20.

Here, the display methods for the image different in the form of the embossed part from an image to be printed out include representing the embossed part in a specific color, representing the embossed part with shadow, flashing the embossed part, and enhancing the height of the embossed part when viewed three-dimensionally.

Figure 5:
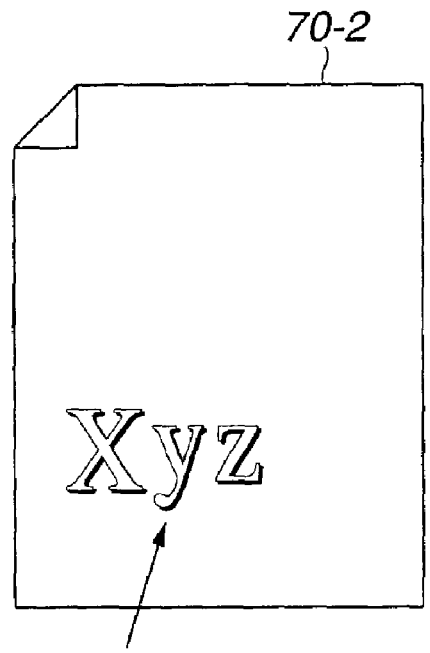
FIG. 5 is a view showing a display example of a preview image representing an embossed part with a shadow.
Figure 6:
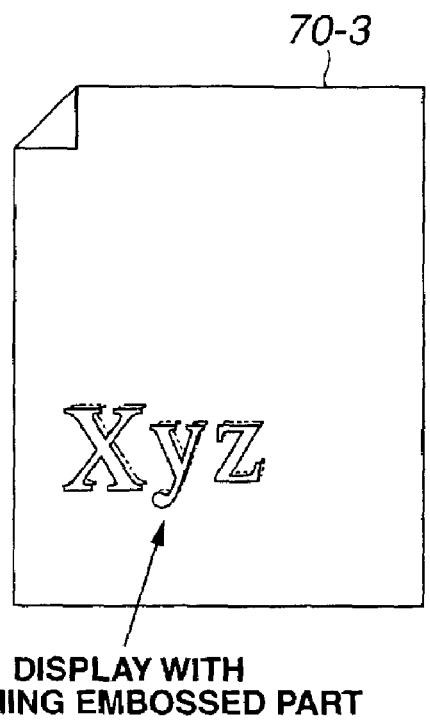
FIG. 6 is a view showing a display example of a preview image representing an embossed part by blinking the part.

FIG. 4, FIG. 5, and FIG. 6 are views showing display examples of the preview images generated by the print simulator 142.

In an example in FIG. 4, an image with an embossed part (character part "Xyz") to which a specific color is specified is generated from image data subject to the embossing print (print file 60) in the print simulator 142, and then is displayed as a preview (preview image 70-1), and the embossed part is represented in the specific color on the preview image 70-1.

In an example in FIG. 5, an image with the embossed part (character part "Xyz") with a shadow is generated from the print file 60 in the print simulator 142, and is displayed as a preview (preview image 70-2), and the embossed part is represented in a form including the shadow on the preview image 70-2.

In an example in FIG. 6, an image with the embossed part (character part "Xyz") to which the blinking representation is specified is generated from the print file 60 in the print simulator 142, and then is displayed as a preview (preview image 70-3), and the embossed part is represented as blinking display on the preview image 70-3.

Although all the examples shown in FIG. 4 through FIG. 6 represent the images different in the form of the embossed part from an image to be printed out in a form seen from the top (top view appearance), a different preview in a form where the entire image to be printed out is perspectively and three-dimensionally seen may be displayed.

Figure 7:
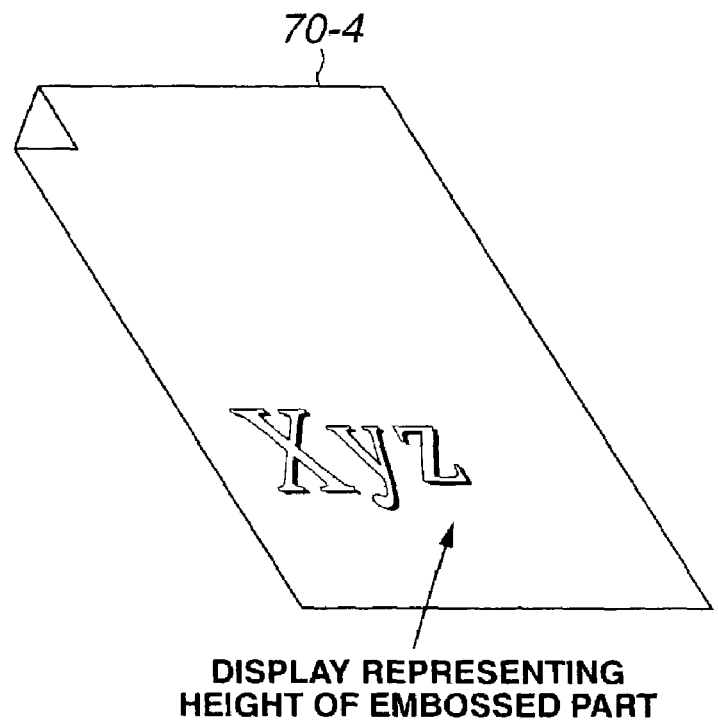
FIG. 7 is a view showing a display example of a preview image representing an embossed part while three-dimensionally rotated and shadowed.

FIG. 7 is a view showing another display example of the preview image from the print simulator 142.

In an example in FIG. 7, an image in a state where the entire image to be printed out is three-dimensionally rotated, and simultaneously having the embossed part (character part "Xyz") expressing the height is generated from the image data subject to the embossing print (print file 60) in the print simulator 142, and is represented as a preview (preview image 70-4). This expressed height may be higher than the height actually obtained on the printout.

In this way, since an image different in the form of the embossed part or the neighborhood thereof from an image to be printed out is generated from the image data subject to the tree-dimensional print, and is displayed as a preview in the image processing apparatus 1 according to the first embodiment, it is possible to easily recognize which object is an embossed part while the display form (such as a specific color, a shadow, blinking, and height) of the embossed part of the preview image is being seen.

The control for the preview display described above may be conducted such that an image processing program, which, on a computer, realizes an image generating function for generating an image, which is different in the form of the embossed part or the neighborhood thereof from an image in image data used for forming an image including an embossed part on a medium, from the image data, and a display control function for displaying the image generated by the image generating function on the display apparatus, is implemented in the memory unit 16 of the image processing apparatus 1, for example, and the control unit 14 executes this image processing program.

In the embodiment described above, though the only the image which is generated from the image data subject to the embossing print, and is different in the form of the embossed part or the neighborhood thereof from an image to be printed out is displayed as a preview, the form of the preview is not limited to this case, and this preview image and an image having a top view appearance faithful to an image to be printed out (an exact top view appearance in the print out file 60 shown in FIG. 1, for example) may be displayed simultaneously or selectively, for example.

In this case, the print simulator 142 must have an image generating function for generating either of or both of the image with the embossed part different in the form from an image to be printed out, and an image with the embossed part faithful in the form to an image to be printed out from image data subject to the embossing print, and a display control function for selectively or simultaneously showing these images as a preview according to an instruction from the UI device 21, for example.

FIG. 8 and FIG. 9 are views showing still other display examples of the preview images from the print simulator 142.

Figure 8A:
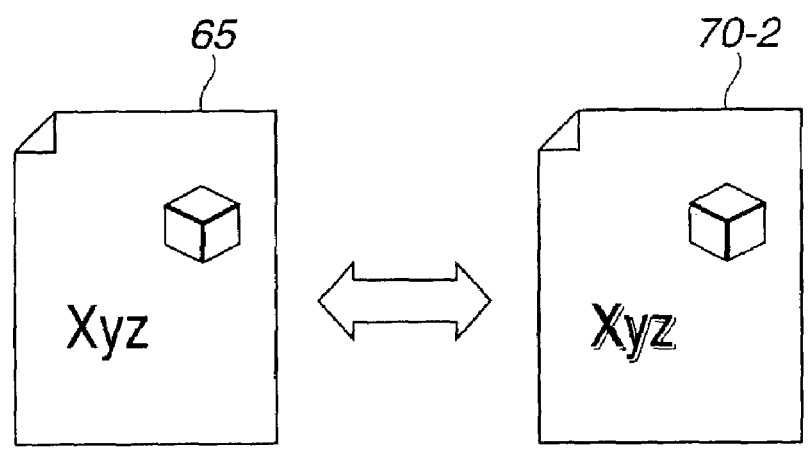
FIGS. 8A and 8B are views showing display examples of preview images respectively representing an image faithful to a printout image, and an image representing an embossed part in a different form selectively or simultaneously.
Figure 8B:
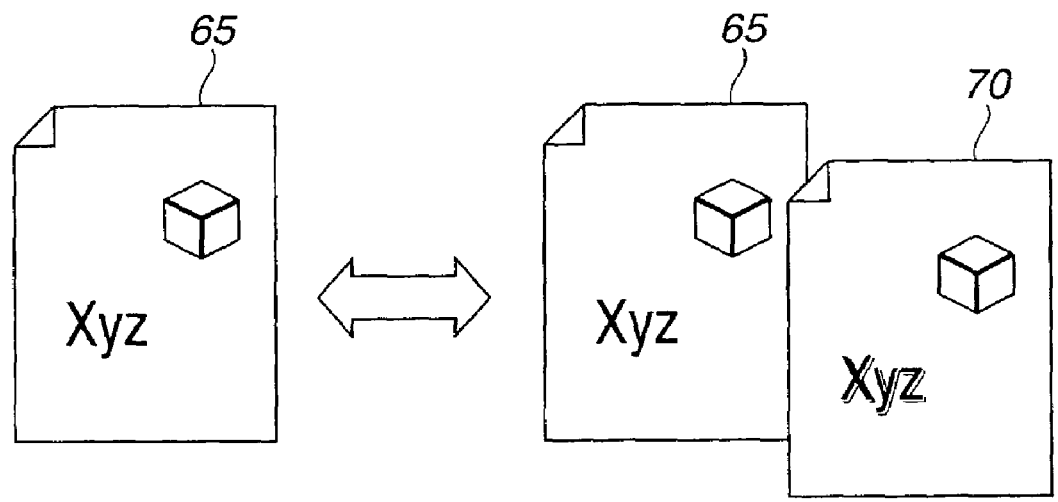

An example in FIG. 8A shows a state where an image having a top view appearance faithful to the printout is generated from the image data subject to the embossing print (print file 60 in this example), and is displayed as a preview image 65 as shown on the left side of FIG. 8A in the print simulator 142 based on an instruction operation for a standard preview display from the UI device 21 by an operator during generating (editing) the print file 60 as described above, for example, and then, an image with the embossed part different in the form from an image to be printed out is generated from the image data subject to the embossing print, and is displayed as a preview (corresponding to the preview image 70-2 shown in FIG. 5) as shown on the right side of FIG. 8A when a predetermined instruction for switching the preview display is provided by the operator from the UI device 21, for example.

An example in FIG. 8B shows a state where an image having a top view appearance faithful to the printout is generated from the image data subject to the embossing print (print file 60 in this example), and is displayed as a preview image 65 as shown on the left side of FIG. 8B in the print simulator 142 based on an instruction operation for a standard preview display from the UI device 21 during generating (editing) the print file 60 as described above, for example, and then, an image with the embossed part different in the form from the image to be printed out is further generated from the image data subject to the embossing print, and is displayed as a preview (corresponding to the preview image 70-2 shown in FIG. 5) next to the preview image 65 described above as shown on the right side of FIG. 8B when a predetermined instruction for a mixed preview display is provided from the UI device 21, for example.

Figure 9A:
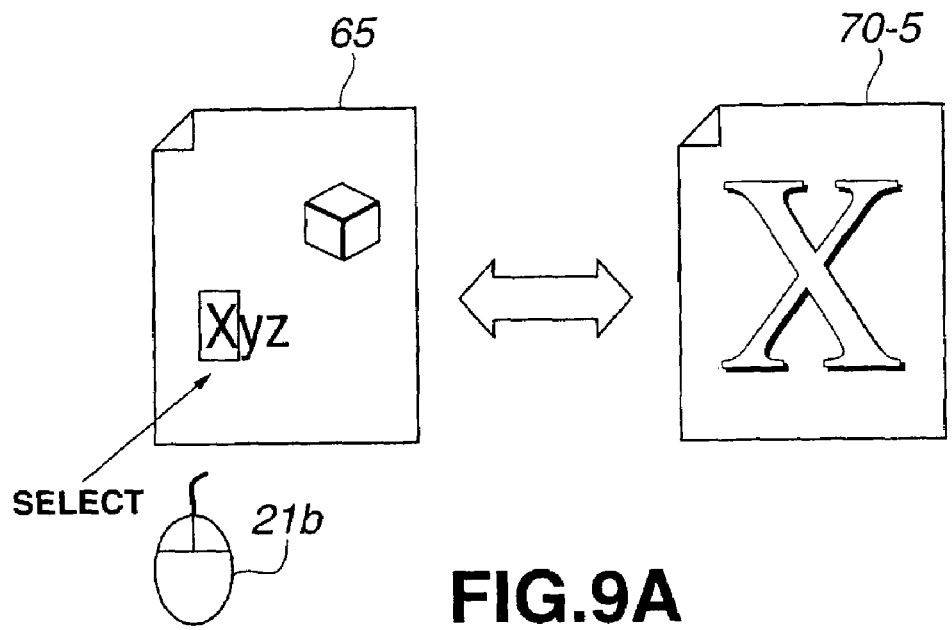
FIGS. 9A and 9B are views showing alternative display examples of preview images respectively representing an image faithful to a printout image, and an image representing an embossed part in a different form selectively or simultaneously.
Figure 9B:
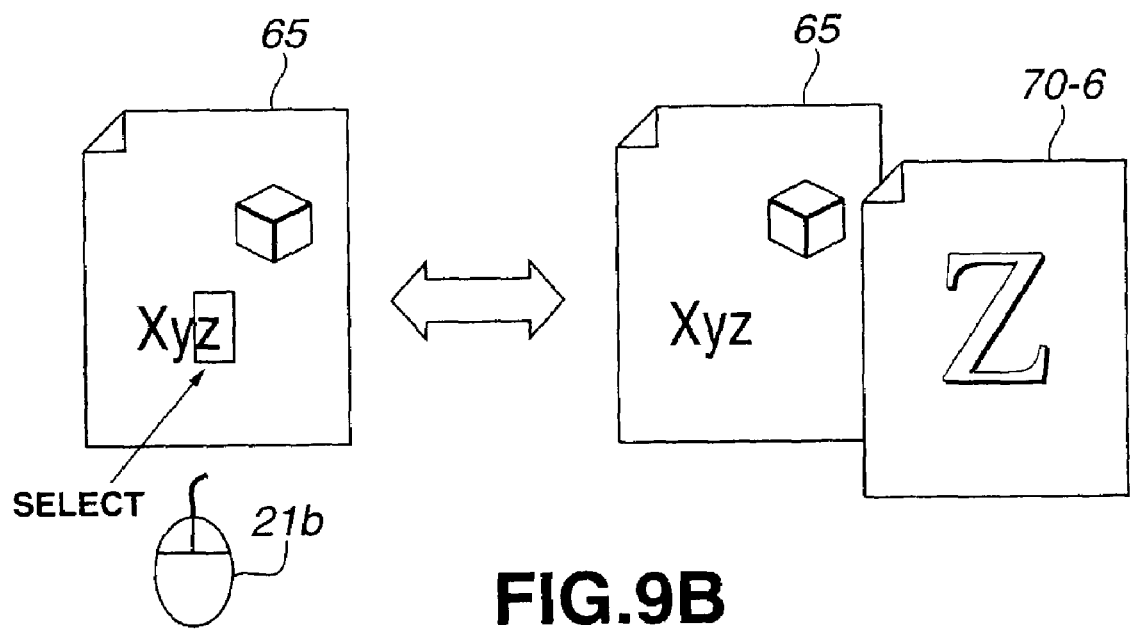

An example in FIG. 9A shows a state where an image having a top view appearance faithful to the printout is generated from the image data subject to the embossing print (print file 60), and is displayed as a preview image 65 as shown on the left side of FIG. 9A in the print simulator 142 based on an instruction operation for a standard preview display from the UI device 21 during generating (editing) the print file 60 as described above, for example, and then, a zoomed-in image with the embossed part different in the form from an image to be printed out is generated from image data corresponding to a specified embossed object in the image data subject to the embossing print, and is displayed as a preview (corresponding to preview image 70-5, display with a shadowed embossed part applied only to the character part "X") as shown on the right side of FIG. 9A when the mouse 21b or the like is used to specify the predetermined embossed object (character part "X" in this example), and simultaneously a predetermined instruction for switching the preview display is provided, for example.

An example in FIG. 9B shows a state where an image having a top view appearance faithful to the printout is generated from the image data subject to the embossing print (print file 60), and is displayed as a preview image 65 as shown on the left side of FIG. 9B in the print simulator 142 based on an instruction operation for a standard preview display from the UI device 21 during generating (editing) the print file 60 as described above, for example, and then, a zoomed-in with the embossed part different in the form from an image to be printed out is further generated from image data corresponding to a specified embossed object in the image data subject to the embossing print, and is displayed as a preview (corresponding to the preview image 70-6, display with a shadowed embossed part applied only to the character part "z") next to the preview image 65 described above as shown on the right side of FIG. 9B when the mouse 21b or the like is used to specify the predetermined embossed object (character part "z" in this example), and simultaneously a predetermined instruction for a mixed preview display is provided, for example.

In any one of the display examples in FIGS. 8A, 8B, 9A, and 9B, the preview display may return to the one on the left side in these drawings when a predetermined instruction for switching back preview display is provided from the UI device 21 during the preview display shown on the right side in these drawings.

As the function for generating an image with a top view appearance faithful to the printout and an image with an embossed part different in the form of an embossed part or the neighborhood thereof from an image to be printed out, and for displaying these images selectively or simultaneously as a preview is provided in this way, this function is effective especially to further comprehend the appearance of the printout in such a case that the characteristics of an embossed part is confirmed by switching from a state where the image faithful to the printout is displayed as a preview to a state where the image with an embossed part different in the form of an embossed part from an image to be printed out is generated and displayed as a preview.

The following section describes the second embodiment.

While it is assumed that an image processing apparatus 1A according to the second embodiment generates an image, which is faithful in a form of an embossed part to an image to be printed out, from data subject to the embossing print, and shows the generated image as a preview (corresponding to the preview image 65 in FIG. 8 and FIG. 9), the apparatus is provided with a control function for controlling such that the embossed part (embossed object) and a non-embossed part (non-embossed object) can be identified.

Here, a method for allowing a user to select a desired object on the preview, and notifying the user of whether the selected object is an embossed part or a non-embossed part is employed as the method for identifying the embossed part and the non-embossed part in the image displayed as the preview as described above.

The notifying method in this case includes a method where the object selected by the user on the preview is highlighted when the object is an embossed part, and the object is not highlighted when the object is a non-embossed part (see FIG. 11).

The notifying method also includes a method where a balloon frame is provided for the object selected by the user on the preview, and the result of the discrimination (whether an embossed part or a non-embossed part) is shown in the frame (balloon display) (see FIG. 12).

Figure 10:
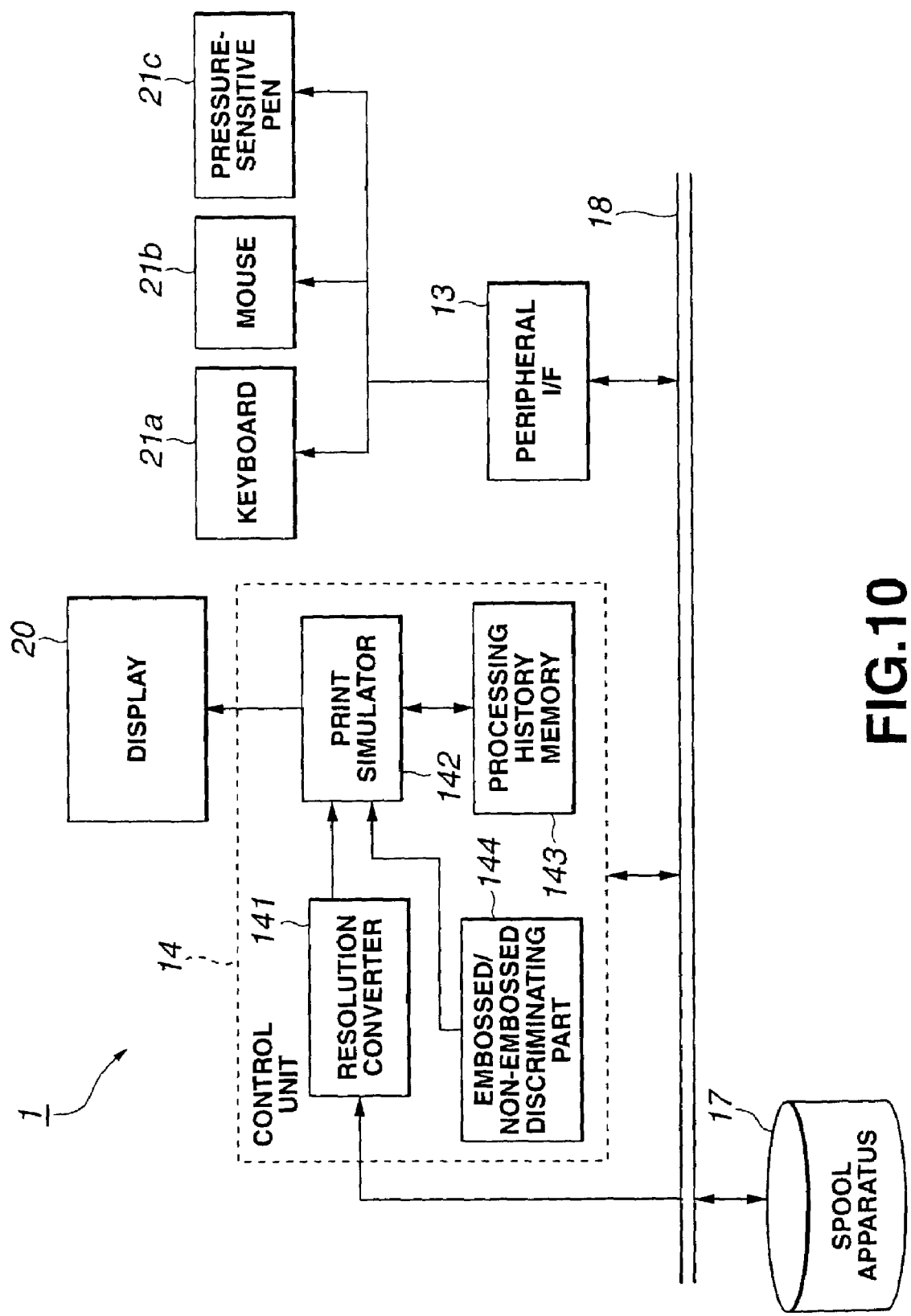
FIG. 10 is a view showing a detailed configuration of a control unit of an image processing apparatus according to a second embodiment.

FIG. 10 shows a detailed configuration of the control unit 14 of the image processing apparatus 1A according to the second embodiment.

The control unit 14 is provided with a resolution converting unit 141, a print simulator 142, a processing history memory unit 143, and an embossed part/non-embossed part discriminating unit 144 in this image processing apparatus 1A.

Here, the resolution converting unit 141 and the processing history memory unit 143 have functions similar to the corresponding units in the image processing apparatus 1 according to the first embodiment described above.

The print simulator 142 has a image control function which generates an image, which is faithful in the form of an embossed part to an image to be printed out, from image data subject to the embossing print, and shows the generated image as a preview (corresponding to the preview image 65 in FIG. 8 and FIG. 9), and simultaneously, displaying an object subject to discrimination such that the object is identifiable (highlight display or balloon display) as an embossed part or a non-embossed part based on a result of the embossed part/non-embossed part discrimination from the embossed part/non-embossed part discriminating unit 144 described later.

The embossed part/non-embossed part discriminating unit 144 discriminates whether an object is an embossed part or a non-embossed part, and notifies the print simulator 142 described above of the discrimination result if the object is specified with a pointing device such as the mouse 21b in the preview image when an image generated from image data subject to the embossing print (an image faithful in the form of an embossed part to an image to be printed out) is displayed as a preview in the print simulator 142.

Then, the following section describes processing operation of the image processing apparatus 1A according to the second embodiment while referring to FIG. 10 through FIG. 12.

FIG. 11 and FIG. 12 are views showing display examples based on the embossed part/non-embossed part identifiable display control in the print simulator 142.

Figure 11A:
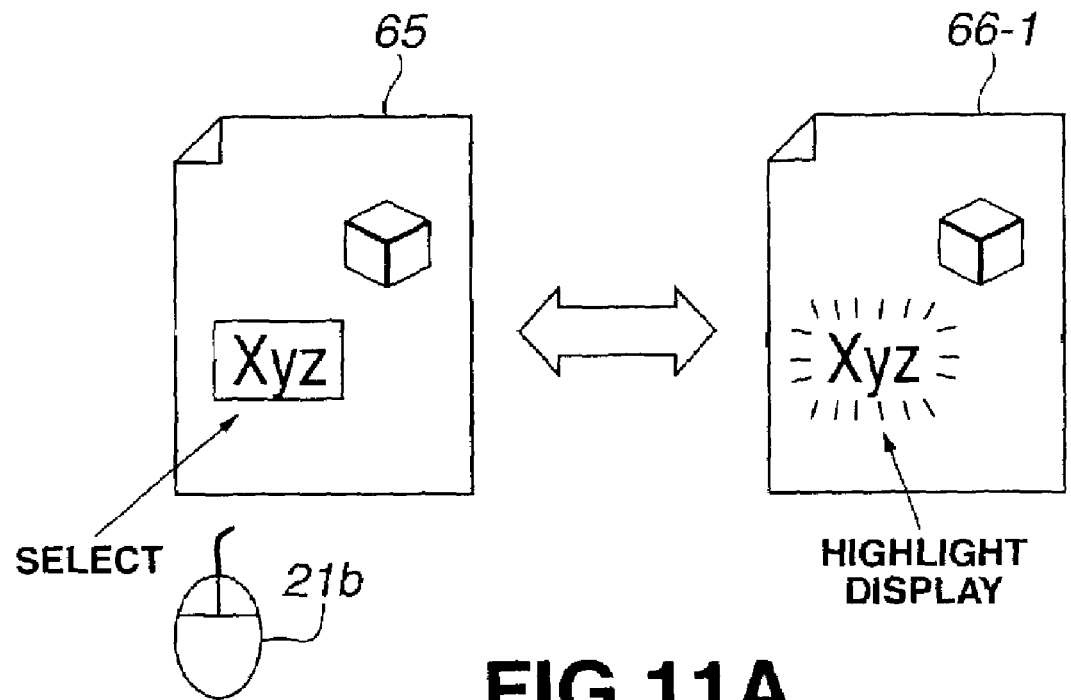
FIGS. 11A and 11B are views showing display examples based on embossed part/non-embossed part identifiable display control.

It is assumed that the print simulator 142 has generated an image, which is faithful in the form of an embossed part to an image to be printed out, from image data subject to the embossing print, and is currently showing the generated image as the preview image 65 on the left side of FIG. 11A in this image processing apparatus 1A.

Since the image, which is faithful in the form of an embossed part to an image to be printed out (the top view appearance), is displayed as the preview image 65 at this moment, the user cannot tell which region is an embossed part and which region is a non-embossed part when the user views this preview image.

The source image data (image data subject to the embossing print) of this preview image is, for example, the print file 60 generated in the image processing apparatus 1A, where the character part "Xyz" is an embossed part, and a figure of a cube at the upper right of it is a non-embossed part.

It is assumed that the user uses the mouse 21b, for example, to select and specify the character part "Xyz" as an object subject to the discrimination as shown on the left side in FIG. 11A when the preview image 65 (an image faithful in the form of an embossed part to an image to be printed out) is shown.

At this moment, in the control unit 14, the embossed part/non-embossed part discriminating unit 144 identifies the specified object region in the image data corresponding to the preview image currently present, and simultaneously, discriminates whether the object is an embossed part or a non-embossed part.

This discrimination as an embossed object or a non-embossed object is conducted by checking whether an embossed part identifying data such as a tag is attached in correspondence to the specified region.

In this case, since the specified object (character part "Xyz") is an embossed part, and is attached with the embossed part identifying data, the embossed part/non-embossed part identifying unit 144 discriminates that the specified object is an embossed part, and notifies the print simulator 142 of the discrimination result.

The print simulator 142 displays an object discriminating image 66-1 where the specified object (character part "Xyz") is highlighted for emphasizing the brightness so as to make the object more remarkable than the other part based on this discrimination result as shown on the right side in FIG. 11A, for example.

Figure 11B:
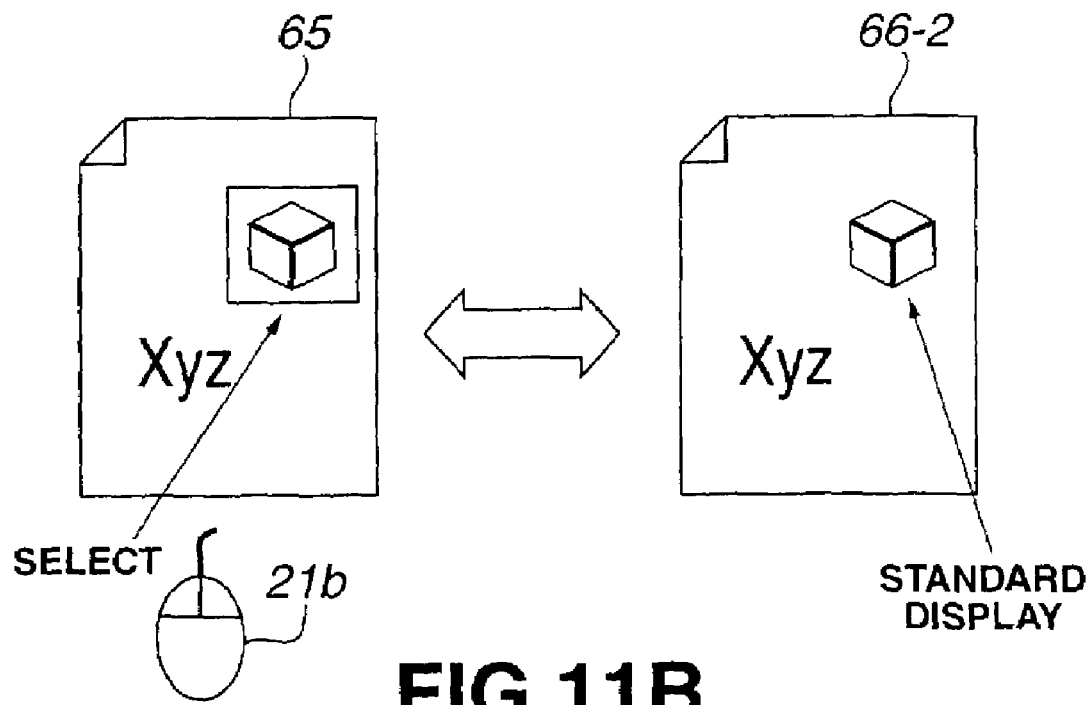

It is assumed that the user uses the mouse 21b, for example, to select and specify the figure of the cube as an object subject to the discrimination as shown on the left side in FIG. 11B when the preview image 65 (an image faithful in the form of an embossed part to an image to be printed out) is displayed.

At this moment, in the control unit 14, the embossed part/non-embossed part discriminating unit 144 identifies the specified object region in the image data corresponding to the preview image currently displayed, and simultaneously, discriminates whether the object is an embossed part or a non-embossed part.

In this case, since the specified figure of the cube is a non-embossed part, and is not attached with the embossed part identifying data, the embossed part/non-embossed part discriminating unit 144 discriminates that the specified object is a non-embossed part, and notifies the print simulator 142 of the discrimination result.

The print simulator 142 displays an object discriminating image 66-2 having the display form (standard display) of specified object (figure of the cube) similar to that of the preview image 65 based on this discrimination result as shown on the right side in FIG. 11B, for example.

While, in the example in FIG. 11, when the object specified by the mouse 21b or the like is an embossed part, the object is highlighted, and when the object is a non-embossed part, the object is not highlighted and is shown in the standard form, text data may be used to show the discrimination result indicating whether the object is an embossed part or a non-embossed part.

The display method is not limited to the method where an object is highlighted (or text data indicating a discrimination result for an embossed part is simultaneously shown) when the object specified by the mouse 21b or the like is an embossed part, and the object is not highlighted (or text data indicating a discrimination result for a non-embossed part is simultaneously shown) when the object is a non-embossed part, and a balloon display may be provided in the form as shown in FIG. 12.

Figure 12A:
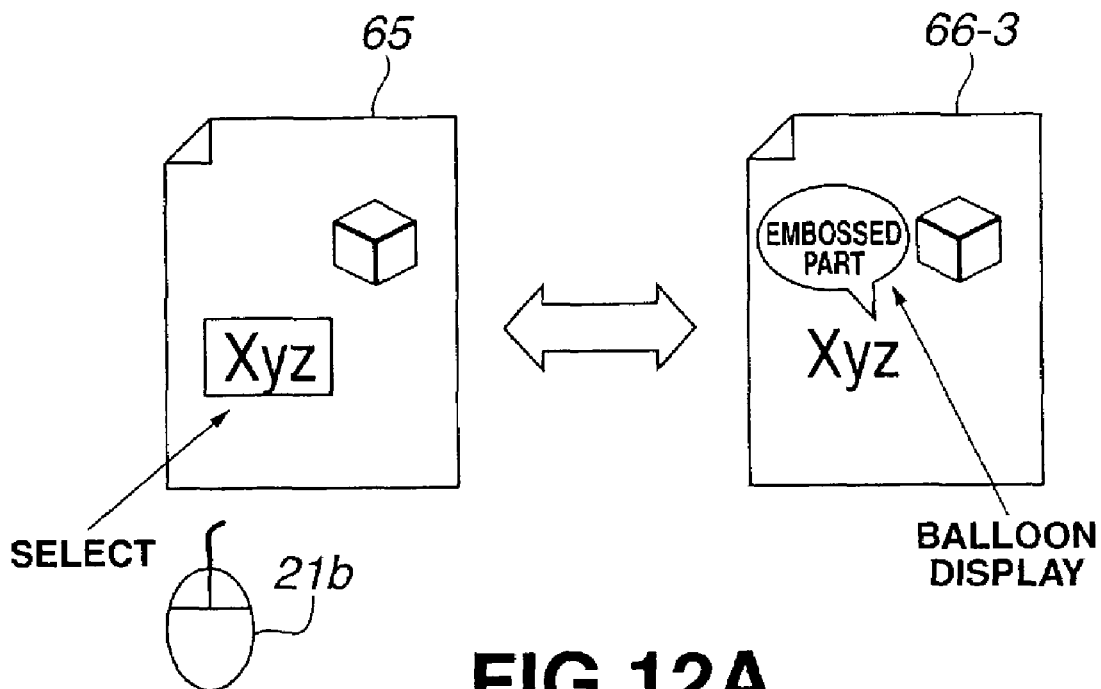
FIGS. 12A and 12B are views showing alternative display examples based on the embossed/non-embossed part identifiable display control.

Namely, in the example in FIG. 12A, if the character part "Xyz" is selected and specified as an object to be discriminated by using mouse 21b as shown on the left side in FIG. 12A during the display of the preview image 65 (image faithful in the form of an embossed part to an image to be printed out) described above, the embossed part/non-embossed part discriminating unit 144 determines that the specified object is an embossed part after going through the process described above, and notifies the print simulator 142 of the discrimination result.

The print simulator 142 displays an object discriminating image 66-3 which has a balloon frame corresponding to the specified object (character part "Xyz"), and simultaneously has a display (balloon display) of a character "embossed part" indicating that the object is an embossed part based on this discrimination result as shown on the right side in the FIG. 12A, for example.

Figure 12B:
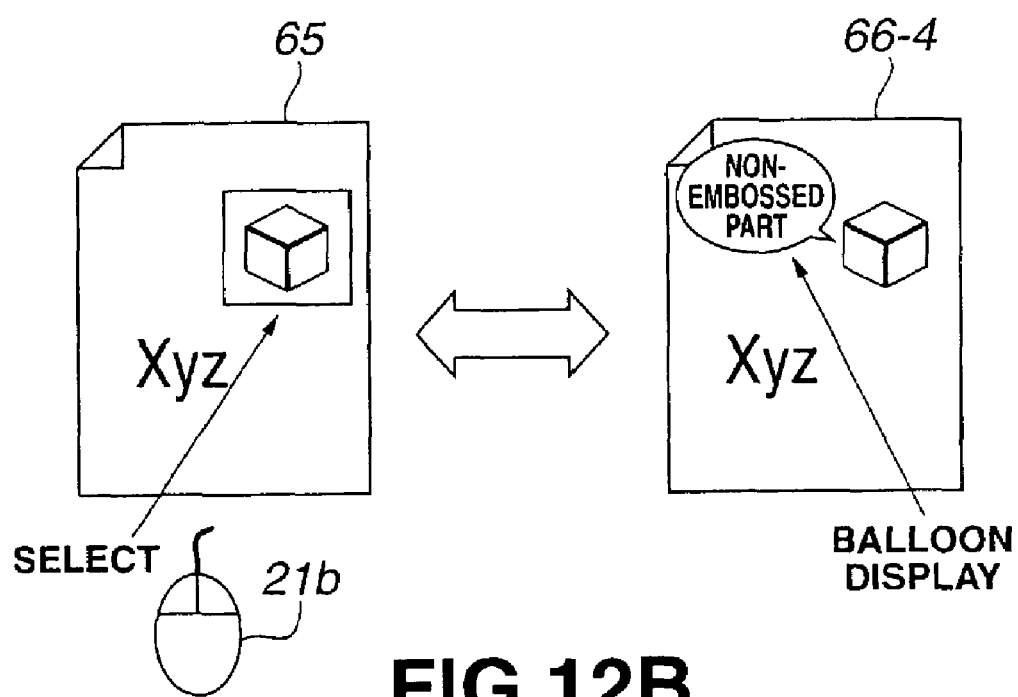

Also, in the example in FIG. 12B, if the cube figure is selected and specified as an object to be discriminated by using mouse 21b as shown on the left side in FIG. 12B during the display of the preview image (an image faithful in the form of an embossed part to an image to be printed out) described above, the embossed part/non-embossed part discriminating unit 144 determines that the specified object is a non-embossed part after going through the process described above, and notifies the print simulator 142 of the discrimination result.

The print simulator 142 displays an object discriminating image 66-4 which has a balloon frame corresponding to the specified object (cube figure), and simultaneously has a display (balloon display) of a character "Non-embossed part" indicating that the object is a non-embossed part based on this discrimination result as shown on the right side in the FIG. 12B, for example.

In this way, an image which is faithful in the form of an embossed part to an image to be printed out is generated from the image data subject to the embossing print, and is displayed as a preview, and simultaneously, a specified object is shown identifiable as an embossed part or a non-embossed part using the highlight display or the balloon display when a predetermined object is specified on this preview image in the image processing apparatus 1A according to the second embodiment.

This control may be conducted such that an image processing program, which, on a computer, realizes an input function for entering identifying data for identifying any one of object included in a displayed image, a discrimination function for discriminating whether the object identified by the identifying data entered by the input function is an embossed object or a non-embossed object, and a notification function for notifying whether the specified object is an embossed part or a non-embossed part based on the discrimination result of the discriminating function, is implemented in the memory unit 16 of the image processing apparatus 1A, for example, and the control unit 14 executes this image processing program.

With this configuration, when a desired object is simply specified on a preview, since whether the object is an embossed part or a non-embossed part is notified, it is easy to identify an embossed object which will be embossed (character part "Xyz" in this example) and a non-embossed object which just has an embossed appearance and is not embossing printed (cube figure in this example).

In the present embodiment, though the print file 60 generated by the image processing apparatus 1A is exemplified as the image data subject to the embossing print, additionally, image data read by an external scanner may be obtained as the image data subject to the embossing print, an image faithful in the form of an embossed part to an image to be printed out may be generated from this image data, and is displayed as a preview, and simultaneously, when a predetermined object is specified on this preview image, the specified object may be shown such that the object can be identified as an embossed part or a non-embossed part by using the highlight display or the balloon display.

In this case, as in the first embodiment, if a condition specifying which color of the three-color data comprising red (R), green (G), and blue (B) corresponds to an embossed part is set in advance, when image data has been entered from a scanner, and an arbitrary object in a preview image is specified while an image generated from this image data (an image faithful in the form of an embossed part to an image to be printed out) is displayed as the preview, the embossed part/non-embossed part discriminating unit 144 can discriminate whether the specified object is an embossed part or a non-embossed part depending on whether the object satisfies the condition described above.

While in the second embodiment, as shown in FIG. 11 and FIG. 12, by using the mouse 21b (pointing device) to select a predetermined object on an image displayed as a preview, the object is discriminated as an embossed part or a non-embossed part. Additionally, it may be so constructed that, for example, identifying data for identifying any one of the objects included in the preview image (such as character data when an object to be discriminated is a character, or a phrase such as "a cubic box" when an object to be discriminated is a cube picture) is be entered from the input unit such as the keyboard 21a, and the object is identified based on the entered identifying data from the input unit, and may be discriminated as an embossed part or a non-embossed part.

An embossed part in image data subject to the printout can be recognized while a preview display (see FIG. 4 through FIG. 7) of an image generated from the image data subject to the embossing print (an image different in the form of the embossed part from an image to be printed out) is being viewed on the image processing apparatus 1, as described above.

The display (the highlight display (see FIG. 11) and the balloon display (see FIG. 12)) displayed by selecting an arbitrary object when an image faithful to an image subject to the embossing print is displayed as a preview allows recognizing which part in the image data subject to the printout is an embossed part on the image processing apparatus 1A according to the second embodiment.

In addition, on the image processing apparatuses 1 and 1A described in the first and second embodiments, it is possible to check in detail the form of an embossed part or to make modification such as adjusting image quality to the embossed part which is recognized based on the different types of displays described above (such as the preview display, the highlight display, and the balloon display) while repeating print simulation where an instruction such as the characteristics of the embossed part (such as the volume and the color of a protrusion, and the color and the size of a shadowed part), zooming in/out, and viewpoint manipulation is provided from the UI device 21 for the embossed part, and the image reproduced reflecting the contents of the instruction is shown for monitoring on the display unit 20, and is reviewed.

This operation for print simulation processing is described while exemplifying the embossed image processing apparatus 1 according to the first embodiment.

FIG. 13 is a view showing processing appearance when partially zooming-in viewer is applied to an embossed part for adjusting image quality.

When this processing for adjusting image quality is conducted, for example, after an embossed part is recognized according to the method described above, the procedure returns to the edit screen for the image data including this embossed part (image data subject to the embossing print), and the embossed object to which the image quality adjustment will be applied is selected from the original image shown on this screen.

In an example in FIG. 13, FIG. 13A shows an appearance where a character part "X", which is an embossed object in the original image, is selected inside a rectangular frame using the UI device 21.

Then, when a protrusion instruction is provided for the selected embossed object (character part "X") from the UI device 21, the print simulator 142 displays an input box for specifying the volume and the color of the protrusion for the embossed object (character part "X") as shown in FIG. 13B.

After the UI device 21 is used to specify a desired volume value or a desired color (red, green, or blue) on this input box, when an instruction for completion of the specification is provided from the UI device 21, the print simulator 142 generates an image reflecting the specified volume value and color from the image data corresponding to the embossed object (character part "X"), and displays an image of the main body of the embossed object in a form shown in FIG. 13C (form where the specified volume and the color are reproduced).

After the embossed object (character part "X") is selected in FIG. 13A, when an instruction for specifying extraction of a shadowed part is provided from the UI device 21 for the embossed object (character part "X"), the print simulator 142 extracts the shadowed part from the embossed object (character part "X"), and displays an image of the shadowed part of the character part "X" in a form shown in FIG. 13D.

Then, when color specification of the shadowed part is instructed from the UI device 21 to the image of the shadowed part of the character part "X", the print simulator 142 displays an input box for specifying the color of the shadowed part as shown in FIG. 13E.

Then, after the UI device 21 is used to specify a desired color (red, green, or blue) on the input box, when an instruction for completion of the specification is provided from the UI device 21, the print simulator 142 displays the image of the shadowed part in the color specified at this time on the display unit 20 as shown in FIG. 13F.

Or, when, in FIG. 13F, the shadowed part of the character part "X" is shown in the color specified in FIG. 13E (or the shadowed part of the character part "X" is shown in the form shown in FIG. 13D), if an instruction for zooming in/out is provided from the UI device 21, the print simulator 142 generates an image reflecting the contents of the instruction (zooming in/out) at this time from the image of the shadowed part of the character part "X", and displays a zoomed-in image or zoomed-out image of the shadowed part of the character part "X" as shown in FIG. 12F (FIG. 13F).

Then, after going through the steps shown from FIG. 13A through FIG. 13F, then after the specifying the characteristic of the embossed object (the volume and the color of the protrusion), and the characteristic of its shadowed part (the color and the zooming in/out of it) is completed, when a preview display instruction is provided from the UI device 21, the print simulator 142 combines the image of the main body of the character part "X" (see FIG. 13C) and the image of the shadowed part of it (FIG. 13F) generated based on the specification so far to generate a combined preview image, and displays the combined preview image after zooming in it as a preview (partially zooming-in viewer) represented with a shadowing technique as shown in FIG. 13G.

When a zoomed-in preview is shown as this partially zooming-in viewer does, the control unit 14 (see FIG. 3) may read in the original image data again, and may apply resolution conversion for the zoom-in in the resolution conversion unit 141 or may apply the zoom-in processing before transmitting the data to the print simulator 142.

When this partially zooming-in viewer is reviewed, ant the image quality of the embossed object is not acceptable, the image quality of the embossed part is adjusted by repeating an operation where a condition such as the volume and color of the protrusion, and the color and size of the shadowed part is changed for re-specifying, and the result is shown on the partially zooming-in viewer.

The form of the embossed part (embossed object) to which the image quality adjustment is applied by using the partially zooming-in viewer can be checked after going through various simulation including zooming in/out it, and changing viewpoint of it (rotating it three-dimensionally).

FIG. 14 are schematic views showing an operation and a display example for a case where a principal part of an embossed object is zoomed in for checking.

Figures 14A, 14B:
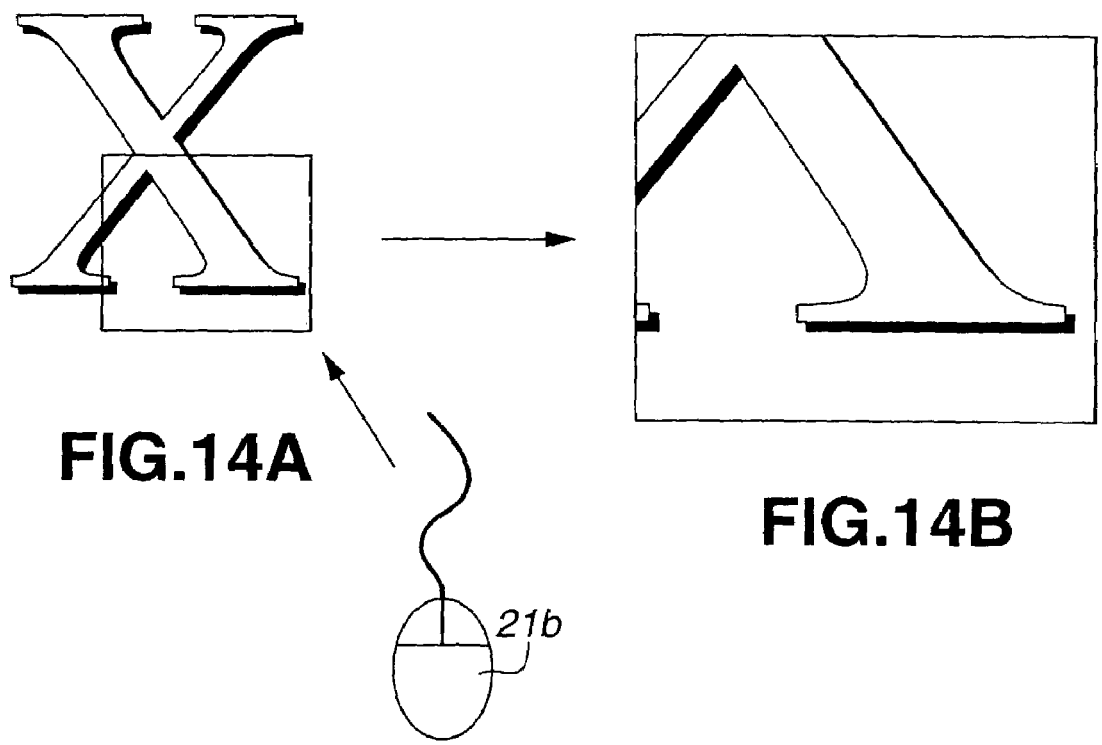
FIGS. 14A and 14B are schematic views showing an operation and a display example for a case where a principal part of an embossed object is zoomed in for review.

In this case, while the embossed object (character part "X") is displayed as a preview, as shown in FIG. 14A, a part to be zoomed in (inside the small rectangular frame) is selected by the mouse 21b, for example, and then, an operation to scroll the mouse 21b is further conducted to magnify the selected area to the area (inside the large rectangular frame) in FIG. 14B.

At this moment, the print simulator 142 generate an image magnified to the size corresponding to the area when the scroll is completed from the image of the area first selected by the mouse 21b, and displays the image in the form shown in FIG. 14B.

The user can review the size of the shadow and the like, for example, in detail while seeing the zooming-in viewer.

Figure 15:
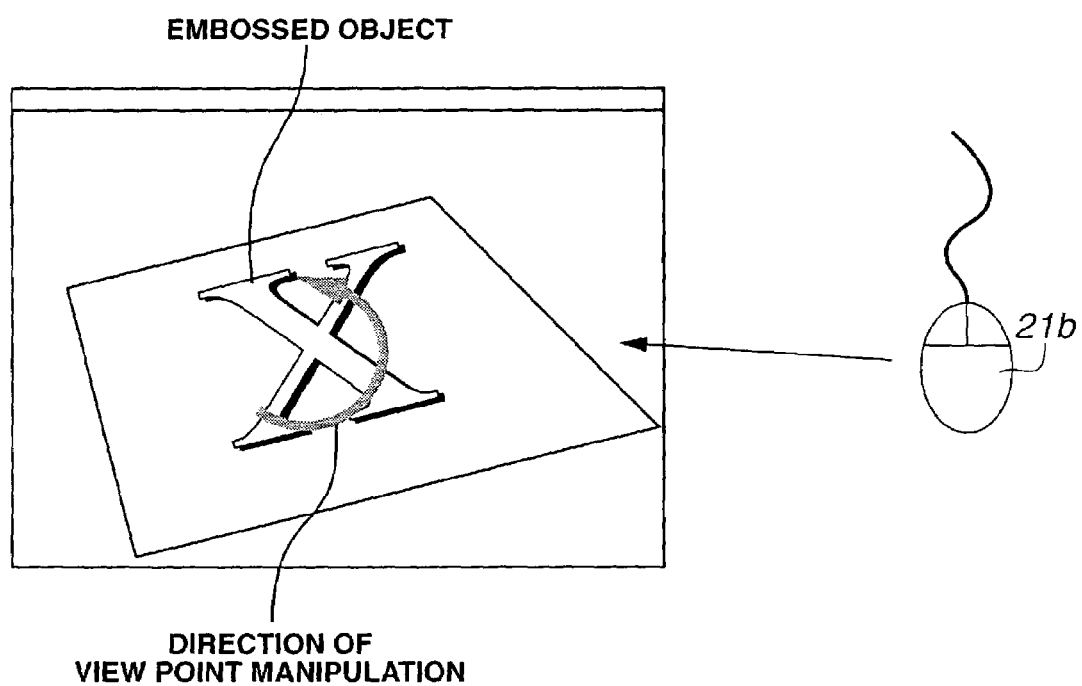
FIG. 15 is a schematic view showing an operation and a display example for a case where an entire image is three-dimensionally rotated for reviewing an embossed object.

FIG. 15 is a schematic view showing an operation and a display example for a case where an entire image subject to the embossing print is rotated in a three-dimensional space for reviewing the state of the embossed object therein.

In this case, when the image including the embossed object is displayed as a preview, a pointing device such as the mouse 21b is used to conduct an operation for instructing to three-dimensionally rotate in a direction indicated by an arrow in FIG. 15, namely to change the viewpoint three-dimensionally.

With this viewpoint operation, the print simulator 142 generates an image which is the entire subject image three-dimensionally rotated according to the rotation instruction from the mouse 21b, and displays the image in the form shown in FIG. 15.

The user properly adjusts the viewpoint to review the appearance of the height of the embossed part in detail while observing the embossed object three-dimensionally, for example.

As a variation of the viewer for reviewing an embossed object by rotating an image in a three-dimensional space, a possible viewer which sets a light source in the three-dimensional space, and enhances the recesses and protrusions (texture) on the surface of the embossed object while manipulating (moving) the light source position with a pointing device such as the mouse 21b is conceivable.

Figure 16:
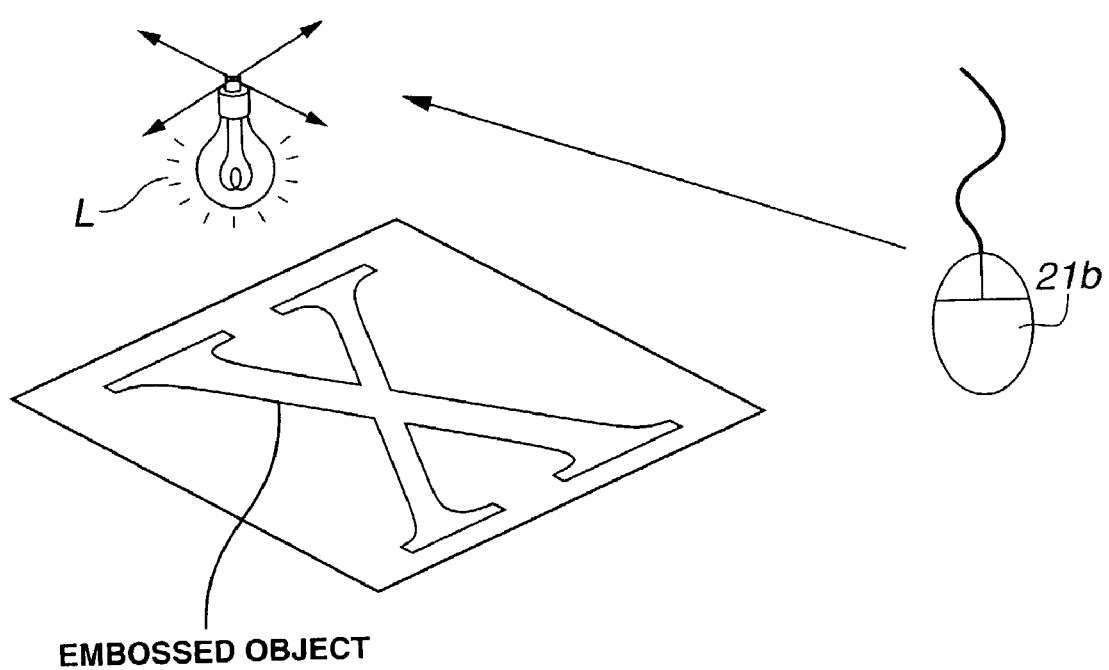
FIG. 16 is a view showing an appearance in the operation of a texture enhancing viewer which allows manipulating a light source in a three-dimensional space.

FIG. 16 is a view showing an appearance in the operation of the texture enhancing viewer which enhances the texture of an embossed object while manipulating the position of a light source in a three-dimensional space.

In this case, while the embossed object (character part "X") is shown being rotated in the three-dimensional space by the viewpoint manipulation shown in FIG. 15, the mouse 21b is used to conduct an operation to finely move the position of a light source L three-dimensionally, and an instruction for completion of the operation is provided in a state where the light source L has moved to a desired position, for example.

On the instruction for completion of the operation, the print simulator 142 uses the bump mapping technique (the reflection direction of light is manipulated to fluctuate by a small amount to simulate an existence of recesses and protrusions) based on the rotation state of the image and the positional relationship of the light source L at this moment to generate an image as a simulation result from the image data corresponding to the embossed object, and displays the image as the texture enhancing viewer.

On this texture enhancing viewer, the position of the light source L determines the direction of the reflection, and the embossed object with enhanced recesses and protrusions on the surface is displayed. Thus, the user can see this texture enhancing viewer to review the texture of the surface of an embossed object in further detail.

Additionally, after reviewing the texture, it is possible to review the texture of the embossed object again on the texture enhancing viewer after resetting the volume of the protrusion of the embossed object and the like following the steps shown in FIG. 13, and then, going through manipulating the view point and the light source position shown in FIG. 16 again, for example.

FIG. 17 are views showing display examples of the texture enhancing viewer which can manipulate the viewpoint and the light source position shown in FIG. 16.

Figure 17A:
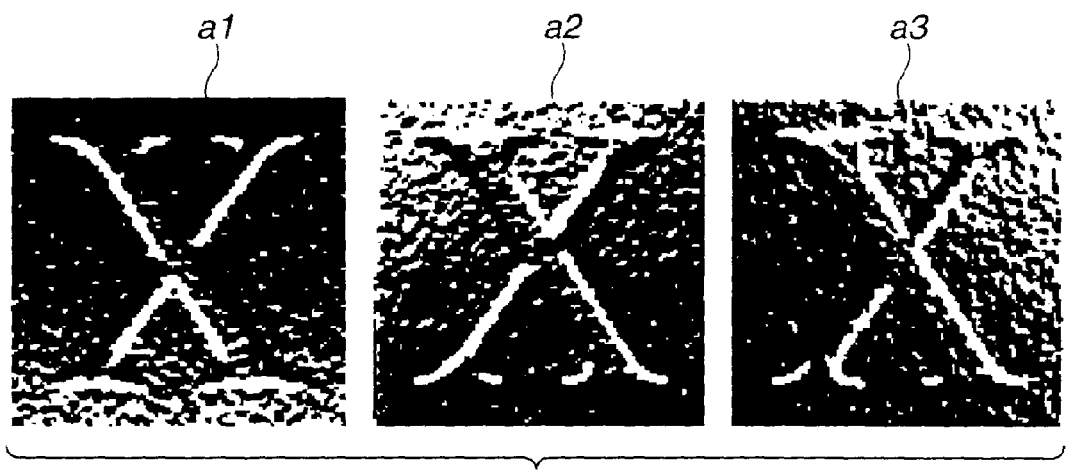
FIGS. 17A and 17B are views showing display examples of the texture enhancing viewer.

FIG. 17A shows examples of the appearance of the viewer when foaming toner is placed on the entire sheet to form the texture, and simultaneously even thicker foaming toner is placed on the character part "X" to embossing this character.

In FIG. 17A, the position of the light source L varies respectively in a1, a2, and a3, and the difference in the reflection direction of light from this light source L presents respective specific textures (recesses and protrusions) on the entire sheet and the surface of the character part.

It will be understood that the volume of a protrusion should be set on the entire image area (the area corresponding to the entire sheet) in addition to the character part when the foaming toner is placed on the entire sheet.

Figure 17B:
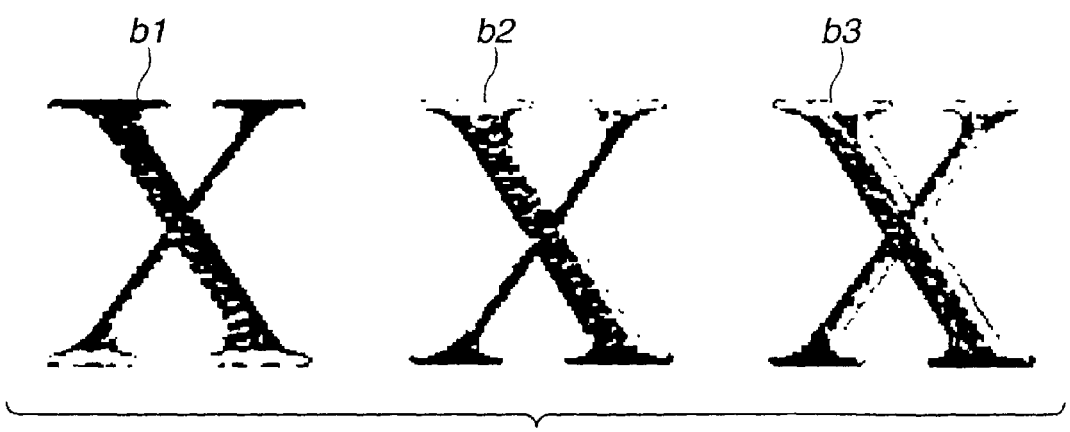

FIG. 17B shows the appearance of the viewer when the foaming toner is placed only on the character part "X" to emboss the character.

In FIG. 17B, the position of the light source L varies respectively in b1, b2, and b3, and the difference in the reflection direction of light from this light source L presents respective specific textures (recesses and protrusions) on the surface of the character part.

In this way, it is possible to repeat the print simulation with the operation method shown in FIG. 13 through FIG. 17 for setting a desired condition (such as the color and the volume of a protrusion, the color and the size of a shadowed part, and the texture of the surface) to an embossed object in image data subject to the embossing print in the image processing apparatus 1.

In the print simulation, though the description is provided for the operation method which uses the input box shown in FIG. 13B for specifying the volume (corresponding to the quantity of the foaming toner) of the protrusion of the embossed part, the operation method is not limited to this example, and the pressure-sensitive pen 21c may be used for the operation, for example.

Figure 18:
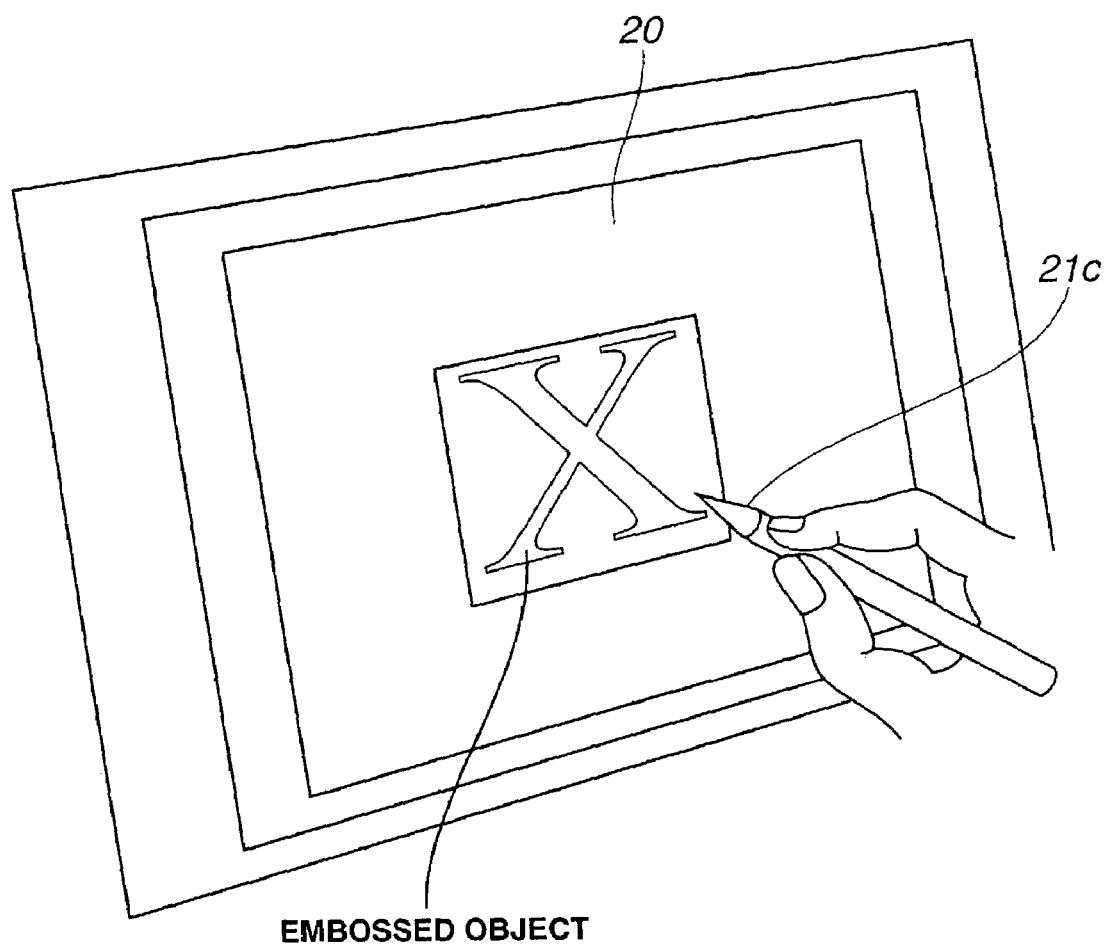
FIG. 18 is a view showing an appearance in the operation when a pressure-sensitive pen is used to set the quantity of foaming toner.

FIG. 18 shows an appearance in the operation when the quantity of the foaming toner is set for an embossed object by using the pressure-sensitive pen 21c.

FIG. 18 shows a scene where the quantity of the foaming toner is set by drawing (tracing) a part to be protruded on the embossed object (character part "X") with the pressure-sensitive pen 21c while the combined preview image described above (see FIG. 13G) is displayed on the display unit 20, for example.

In this case, the pressure-sensitive pen 21c is operated for drawing such that a larger pen pressure is applied to (a larger force is used to press) a part where a protrusion should be higher, and a smaller pen pressure pen pressure is applied to (a smaller force is used to press) a part where a protrusion should be lower.

The pen pressure of the pressure-sensitive pen 21c is detected when it is operated for drawing, and the magnitude of the pen pressure can be entered as data representing the quantity of the foaming toner (corresponding to the volume of the protrusion described in FIG. 13).

Figure 19A:
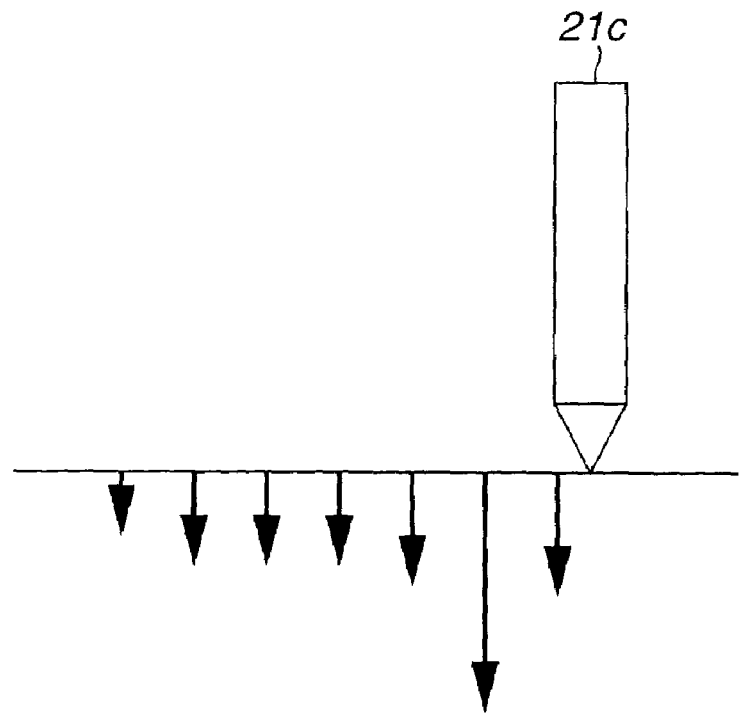
FIGS. 19A and 19B are views showing a relationship between the pen pressure (pressure) of the pressure-sensitive pen and the quantity of the foaming toner.
Figure 19B:
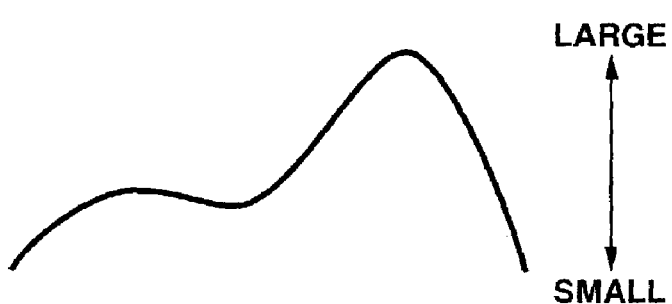

FIG. 19 are views showing a relationship between the pen pressure (pressure) of the pressure-sensitive pen 21c and the quantity of the foaming toner. In FIG. 19A, the length of arrows shows the magnitude of the pen pressure of the pressure-sensitive pen 21c. FIG. 19B is a view showing the quantity of the foaming toner corresponding to the pen pressure in FIG. 19A, the larger the pen pressure becomes, the larger the quantity of the foaming toner becomes, and the smaller the pen pressure becomes, the smaller the quantity of the foaming toner becomes.

Figure 20:
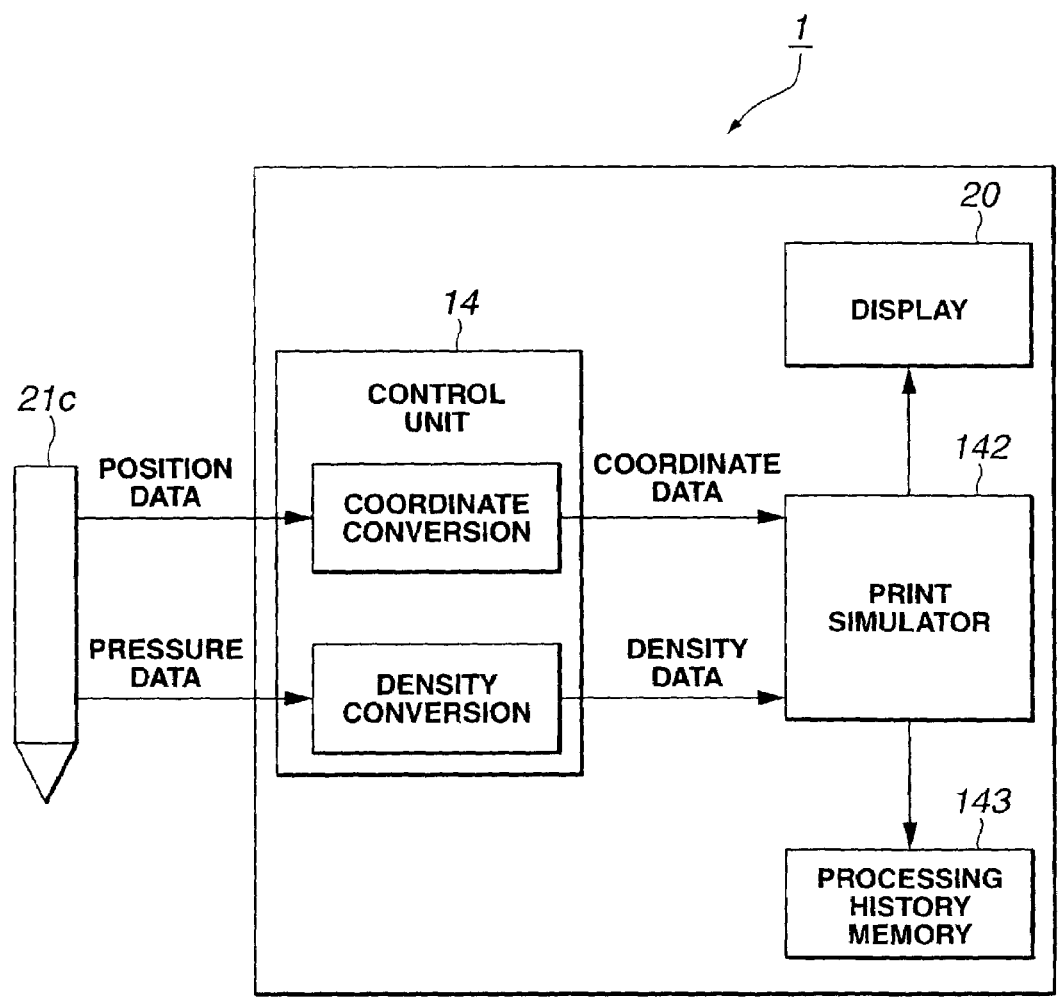
FIG. 20 is a view showing a flow of signal processing when the quantity of the foaming toner is set with the pressure-sensitive pen.

FIG. 20 is a view showing a flow of signal processing when the quantity of the foaming toner is set with the pressure-sensitive pen 21c during the operation shown in FIG. 18.

In FIG. 20, when the user uses the pressure-sensitive pen 21c to trace a desired part of an embossed object on the preview displayed on the display unit 20 (monitor), the position and the pressure of the pressure-sensitive pen 21c at this time are detected, position data and pressure data respectively representing the detected position and pen pressure is supplied for the control unit 14 in the image processing apparatus 1 through the peripheral I/F 13 (not shown in FIG. 20).

In the control unit 14, the position data is converted into coordinate data on the monitor screen, and simultaneously, the pressure data is converted into density data representing the quantity of the foaming toner, and the coordinate data and the density data is supplied for the print simulator 142.

The print simulator 142 analyzes the entered coordinate data and the density data, updates the form of the embossed object displayed on the display unit 20 as a preview to the form reflecting the density data set this time, and displays the object. Also, accordingly, the processing history memorized so far is updated to contents reflecting the setting of the density data this time in the processing history memory unit 143.

Though the viewpoint manipulating viewer (see FIG. 15) and the quantity enhancing viewer (see FIG. 16) are intended for a preview deployed in the three-dimensional space, the three-dimensional display may be just switched between on and off for the operation if the three-dimensional preview of the embossing print is not always necessary.

Figures 21A, 21B:
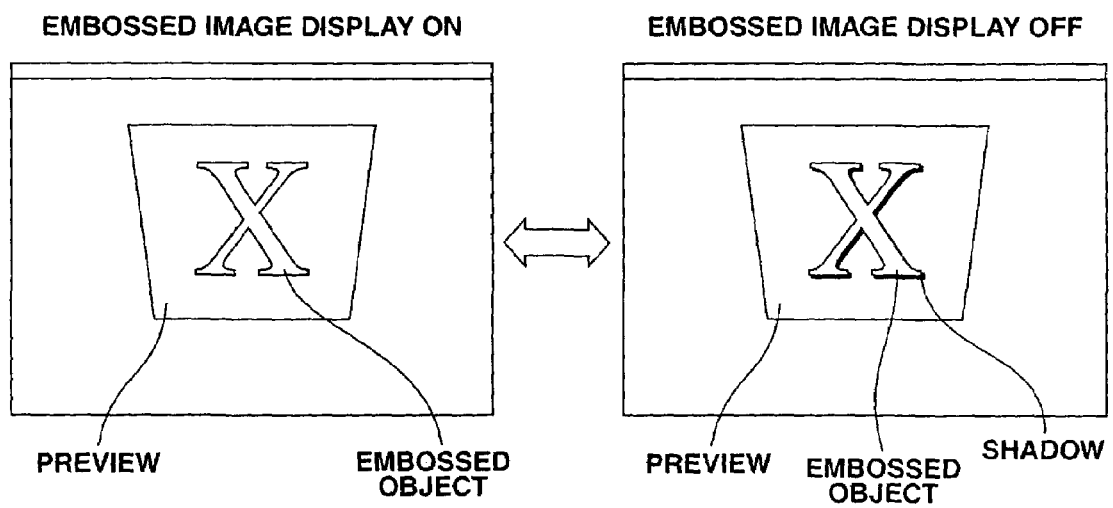
FIGS. 21A and 21B are views showing appearances for switching on/off an embossed image display.

FIG. 21 show appearances for switching on/off the embossed image display. FIG. 21A shows a display appearance when the embossed image display is off, and FIG. 21B shows a display appearance (display with shadow) when the embossed image display is on.

As observed from FIG. 21, an embossed object (character part "X" in this example) in image data subject to the embossing print is directly shown in the preview as an image faithful in the top view appearance of an embossed part to an image subject to the embossing print when the embossed image display is off (see FIG. 21A).

On the other hand, the embossed object (character part "X" in this example) in the image data subject to the embossing print is shown in the preview as an image different in the form of an embossed part from an image subject to the embossing print (display with shadow in this example) when the embossed image display is on (see FIG. 21B).

In the print simulation described so far, the processing history in the print simulator 142 based on the different conditions (such as the volume and color of a protrusion, and the color of a shadow) specified by the UI device 21 is sequentially stored in the processing history memory unit 143.

Then, when the user conducts a final confirmation instruction operation from the UI device 21 after the user confirms that preferred image quality and the like is set to the embossed part on the preview image, the control unit 14 creates a job file based on the processing history stored in the processing history memory unit 143 at the time of the final confirmation.

Then, when a print instruction corresponding to certain image data is entered from the UI device 21, the image data and a job file corresponding to this image data are combined, and are transmitted to the embossing printer 3. The embossing printer 3 uses the image data and the job file corresponding to it transmitted from the image processing apparatus 1 to provide embossing print.

Figure 22:
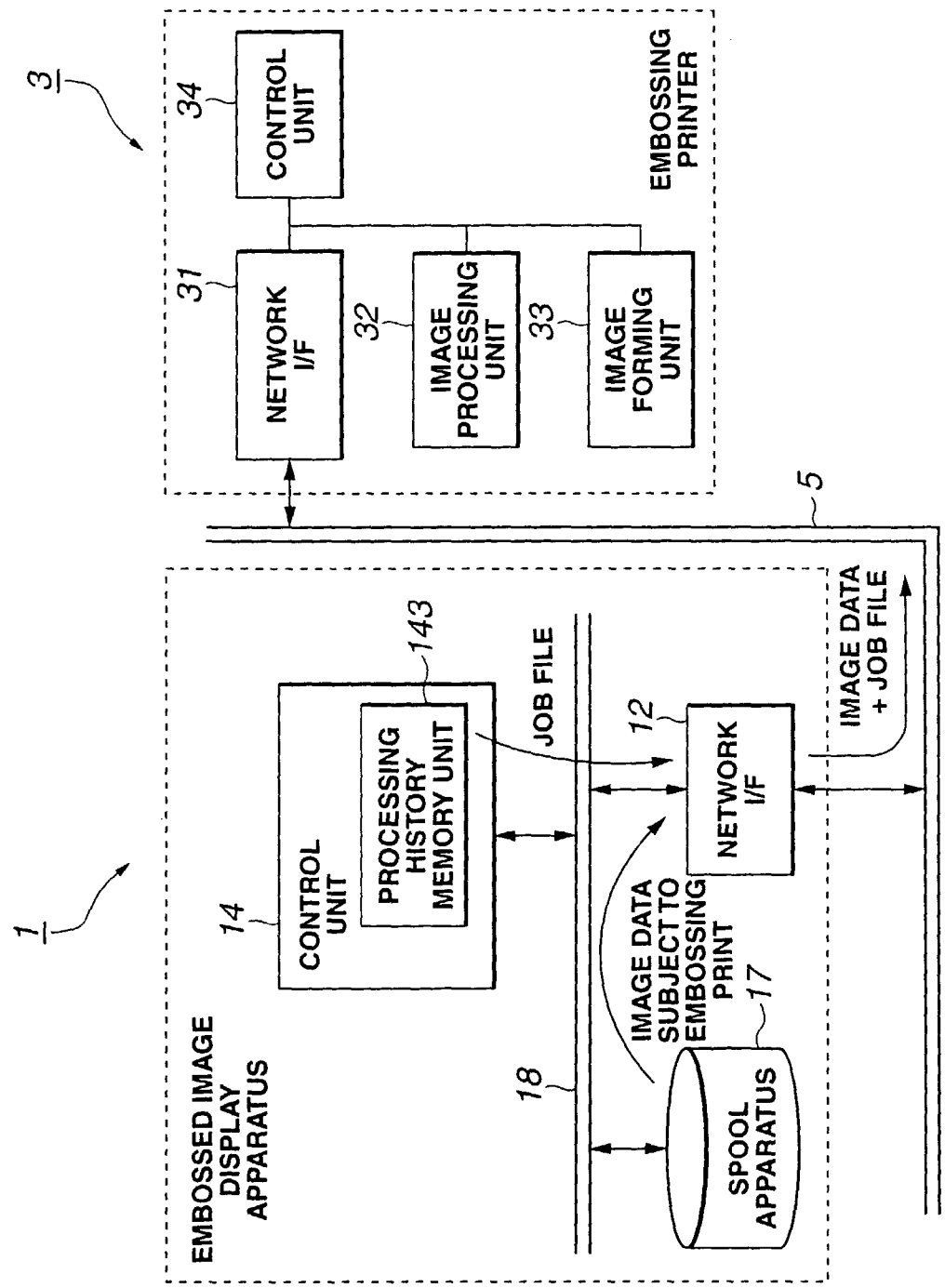
FIG. 22 is a view showing a flow of signals relating to print operation of an embossing printer.

The following section describes print operation of the embossing printer 3 based on a print instruction from the image processing apparatus 1 while referring to FIG. 22.

FIG. 22 is a view showing a flow of a signal relating to the print operation of the embossing printer 3.

In FIG. 22, the control unit 14 reads out image data (print file 60, for example) subject to the embossing print from the spool apparatus 17, and simultaneously reads out a job file corresponding to the image data (processing history corresponding to the image data) from the processing history memory unit 143, and the image data and the job file are combined, and are transmitted to the embossing printer unit 3 through the network I/F 12 when a print instruction indicating a start of the embossing print is entered from the keyboard 21a, for example, in the image processing apparatus 1.

The embossing printer 3 comprises a network interface (I/F) 31 managing an interface with the network 5 interposed between the printer 3 and the image processing apparatus 1, an image processing unit 32 which uses the image data and the job file received from the image processing apparatus 1 through the network I/F 31 to conduct image processing for generating embossing print data, an image forming unit 33 for printing out embossing print based on the embossing print data generated by the image processing unit 32, and the main control unit 34 for controlling the entire printer apparatus.

The image data and the job file transmitted from the image processing apparatus 1 over the network 5 are received through the network I/F 31, and are supplied for the image processing unit 32 in the embossing printer 3.

The image processing unit 32 first analyzes the job file, identifies and separates an area for an embossed part, and simultaneously generates image data for the foaming toner comprising a foaming toner signal (foaming toner gradation data) which determines the quantity of the foaming toner placed on the embossed part based on a specified condition (such as the volume of a protrusion specified in the print simulation in the image processing apparatus 1) to the embossed part.

Also, the image processing unit 32 applies predetermined image processing such as shading correction, misalignment correction, lightness/color space conversion, gamma correction, frame removal, and color/movement editing to the image data subject to the embossing print (print file, in this example) to generate a draft color material gradation data in four colors comprising yellow (Y), magenta (M), cyan (C), and black (BK) (respectively 8 bits).

Further, the image processing unit 32 combines the four-color draft color material gradation data and the foaming toner gradation data, and transmits them as embossing print data to the image forming unit 33.

The image forming unit 33 has exposing/developing units for respectively forming toner (normal toner, i.e. non-foaming toner) images in the four colors comprising yellow (Y), magenta (M), cyan (C), and black (BK), and an exposing/developing unit for forming a foaming toner (H) image, and further has a intermediate transfer body for multi-layer-transferring (primary-transferring) the four-color toner image and the foaming toner image formed by the exposing/developing units in the respective colors, a transfer unit for transferring (secondary-transferring) the toner images multilayer-transferred on the intermediate transfer body to a recording sheet, and a fixing unit for fixing the toner images on the recording sheet on which the toner images are transferred.

The draft color material gradation data in four colors comprising yellow (Y), magenta (M), cyan (C), and black (BK) (respectively 8 bits), and the foaming toner gradation data generated in the image processing unit 32 are transmitted to the respective exposing/developing units in the image forming unit 33, and the individual exposing/developing units form the toner images in the individual colors and the foaming toner image respectively.

Then, the toner images in the individual colors and the foaming toner image are transferred to the intermediate transfer body while the toner images are sequentially laminated on one another, and further the toner images are transferred from the intermediate transfer body to the recording sheet simultaneously.

If the toner images multi-layer-transferred on the intermediate transfer belt are transferred to the recording sheet in the subsequent process, the sequence of the multi-layer toner images are reversely arranged, and the foaming toner image is transferred to the lowermost layer.

Consequently, when the fixing unit fixes the toner images multi-layer-transferred on the recording sheet, the heat applied in the fixing process foams and embosses the foaming toner on the lowermost layer. Also, the toner images in the individual colors multi-layer-transferred on the foaming toner, which is embossed as a result of the foaming, are fixed as a color image corresponding to the number of the toner colors at this moment.

Consequently, an embossed color image where a color image (color materials) is formed on the embossing foaming toner (embossing material) is formed on the recording sheet.

The present invention is not limited to the aforementioned and simultaneously illustrated embodiments, and may be properly modified and applied in practice without changing essence thereof.

For example, in the configurations in FIG. 3 and FIG. 10, the print simulator 142 may be implemented by software processing, or may be provided as a dedicated hardware. The history memory unit 143 may be a dedicated memory or utilizes a part of a general-purpose memory in the computer.

In the configuration in FIG. 22, the embossing printer 3 may be directly connected with the image processing apparatus 1 without the connection over the network 5. When the embossing printer 3 is directly connected with the image processing apparatus 1, or the network 5 connecting both of them with each other has a broad bandwidth, it is possible to construct such a constitute that analyzing the job file and generating the output image data in the individual colors are processed by software in the image processing apparatus 1, and then the result is transmitted to the embossing printer 3.

The preview in the present invention includes an edit screen such as a layout display supported by different types of application software in addition to the print preview which displays an image simulating a printed form of the image data.

What is claimed is:

1. An image processing apparatus that forms an image data including in a part thereof an identifying data for identifying an embossed part and transmits the image data to a printer wherein an area of the embossed part identified by the identifying data is printed on a medium with a heat foaming toner to form an image on the medium whereby the area of the embossed part is selectively embossed from the medium, the image processing apparatus comprising:

a preview image generating unit that generates a preview image corresponding to the image to be formed on the medium in such a manner that the embossed part that is identified by the identifying data is distinguishable from rest of the preview image; and a display control unit that display the preview image generated by the preview image generating unit on a display.

2. The image processing apparatus according to claim 1, wherein the preview image generating unit generates the preview image with the embossed part being expressed in a specific color.

3. The image processing apparatus according to claim 1, wherein the preview image generating unit generates the preview image with the embossed part being expressed as an image having a shadow.

4. The image processing apparatus according to claim 1, wherein the preview image generating unit generates the preview image with the embossed part being expressed by an image that blinks.

5. The image processing apparatus according to claim 1, wherein the preview image generating unit generates the preview image in which the whole image to be formed on the medium is shown perspectively and three-dimensionally with the embossed part being expressed as having height.

6. The image processing apparatus according to claim 1, wherein the display control unit displays the preview image generated by the preview image generating unit and a preview image corresponding to the image data, selectively or simultaneously.

7. An image processing apparatus that forms an image data including in a part thereof an identifying data for identifying an embossed part, and transmits the image data to a printer wherein an area of the embossed part identified by the identifying data is printed on a medium with a heat foaming toner to form an image on the medium whereby the area of the embossed part is selectively embossed from the medium, the image processing apparatus comprising:

a display control unit that display a preview image corresponding to the image data on a display;

an input unit that enters specifying data for specifying one of a plurality of objects contained in the preview image displayed on the display by the display control unit;

a discriminating unit that discriminates whether an object specified by the specifying data is an embossed part identified by the identifying data or not; and a notifying unit that notifies whether the object specified by the specifying data is the embossed part identified by the identifying data or not based on a discrimination result of the discriminating unit.

8. The image processing apparatus according to claim 7, wherein the notifying unit highlights the object displayed on the display and discriminated to be the embossed part by the discriminating unit.

9. The image processing apparatus according to claim 7, wherein the notifying unit displays text data indicating the discrimination result of the discriminating unit on the display.

10. A computer-readable medium storing a program causing a computer to execute a process for an image processing in which an image data including in a part thereof an identifying data for identifying an embossed part is formed and the image data is transmitted to a printer wherein an area of the embossed part identified by the identifying data is printed on a medium with a heat foaming toner to form an image on the medium whereby the area of the embossed part is selectively embossed from the medium, the process comprising:

a step of generating a preview image corresponding to the image to be formed on the medium in such a manner that the embossed part that is identified by the identifying data is distinguishable from rest of the preview image: and a step of displaying the preview image generated by the preview image generating unit on a display.

11. The computer-readable medium according to claim 10, wherein the preview image generating step generates the preview image with the embossed part being expressed in a specific color.

12. The computer-readable medium according to claim 10, wherein the preview image generating step generates the preview image with the embossed part being expressed by an image having a shadow.

13. The computer-readable medium according to claim 10, wherein the preview image generating step generates the preview image with the embossed part being expressed by an image that blinks.

14. The computer-readable medium according to claim 10, wherein the preview image generating step generates the preview image in which the whole image to be formed on the medium is shown perspectively and three-dimensionally with the embossed part being expressed as having height.

15. The computer-readable medium according to claim 10, wherein the displaying step displays the preview image generated by the preview image generating unit and a preview image corresponding to the image data, selectively or simultaneously.

16. A computer-readable medium storing a program causing a computer to execute a process for an image processing in which an image data including in a part thereof an identifying data for identifying an embossed part is formed and the image data is transmitted to a printer wherein an area of the embossed part identified by the identifying data is printed on a medium with a heat foaming toner to form an image on the medium whereby the area of the embossed part is selectively embossed from the medium, the process comprising:

a step of displaying a preview image corresponding to the image data on a display;

a step of inputting specifying data for specifying one of a plurality of objects contained in the preview image displayed on the display by the display control unit;

a step of discriminating whether an object specified by the specifying data is an embossed part identified by the identifying data or not; and a step of notifying whether the object specified by the specifying data is the embossed part identified by the identifying data or not based on a discrimination result of the discriminating unit.

17. The computer-readable medium according to claim 16, wherein the notifying step highlights the object displayed on the display and discriminated to be the embossed part by the discriminating unit.

18. The computer-readable medium according to claim 16, wherein the notifying step displays text data indicating the discrimination result of the discriminating unit on the display.

19. An image processing method for forming an image data including in a part thereof an identifying data for identifying an embossed part transmitting the image data to a printer wherein an area of the embossed part identified by the identifying data is printed on a medium with a heat foaming toner to form an image on the medium whereby the area of the embossed part is selectively embossed from the medium, the method comprising;

generating a preview image corresponding to the image to be formed on the medium in such a manner that the embossed part that is identified by the identifying data is distinguishable from rest of the preview image; and displaying the preview image generated by the preview image generating unit on a display.

20. An image processing method for forming an image data including in a part thereof an identifying data for identifying an embossed part transmitting the image data to a printer wherein an area of the embossed part identified by the identifying data is printed on a medium with a heat foaming toner to form an image on the medium whereby the area of the embossed part is selectively embossed from the medium, the method comprising:

displaying a preview image corresponding to the image data on a display;

inputting specifying data for specifying one of a plurality of objects contained in the preview image displayed on the display by the display control unit;

discriminating whether an object specified by the specifying data is an embossed part identified by the identifying data or not; and notifying whether the object specified by the specifying data is the embossed part identified by the identifying data or not based on a discrimination result of the discriminating unit.

* * * * *